(12) United States Patent
Gao et al.

(10) Patent No.: US 12,196,720 B1
(45) Date of Patent: Jan. 14, 2025

(54) TEST METHODS FOR MEASURING FORCE SITUATIONS OF TREE-SHAPED SPATIAL NODES

(71) Applicant: HEFEI UNIVERSITY OF TECHNOLOGY, Anhui (CN)

(72) Inventors: Peng Gao, Hefei (CN); Xue Zhang, Hefei (CN); Zongcheng Yin, Hefei (CN); Zhiqiang Wang, Hefei (CN); Xuan Yang, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/822,451

(22) Filed: Sep. 2, 2024

(30) Foreign Application Priority Data

Jan. 30, 2024 (CN) .......................... 202410123548.9

(51) Int. Cl.
*G01N 3/08* (2006.01)
*G01D 21/00* (2006.01)

(52) U.S. Cl.
CPC .............. *G01N 3/08* (2013.01); *G01D 21/00* (2013.01); *G01N 2203/0017* (2013.01); *G01N 2203/0019* (2013.01); *G01N 2203/0032* (2013.01); *G01N 2203/0274* (2013.01)

(58) Field of Classification Search
CPC ............. G01N 3/08; G01N 2203/0017; G01N 2203/0032; G01N 2203/0019; G01N 2203/0274; G01D 21/00
See application file for complete search history.

(56) References Cited

U.S. PATENT DOCUMENTS

| 6,832,455 B1 | 12/2004 | Tomlinson et al. |
| 2022/0011205 A1 | 1/2022 | Yang et al. |
| 2023/0122718 A1 | 4/2023 | Chen et al. |

FOREIGN PATENT DOCUMENTS

| CN | 101408474 A | 4/2009 |
| CN | 102539189 A | 7/2012 |
| CN | 203811405 U | 9/2014 |
| CN | 105203398 A | 12/2015 |

(Continued)

OTHER PUBLICATIONS

Gu, Min et al., Study on Static Behavior of Multiplanar Cast Steel Joints, Structural Engineers, 22(3), 2006, 5 pages.

(Continued)

*Primary Examiner* — Jonathan M Dunlap
(74) *Attorney, Agent, or Firm* — PORUS IP LLC

(57) ABSTRACT

Disclosed is a test method for measuring a force situation of a tree-shaped spatial node, and the test method is realized by a reaction frame device. The reaction frame device includes a raft foundation and a reaction frame fixedly mounted on the raft foundation, a cavity is formed inside the reaction frame to accommodate a tree-shaped spatial node; a main pipe of the tree-shaped spatial node is plumb-fastened to the raft foundation, and a force measurement assembly is arranged in an upper space of the cavity, which can simultaneously apply force of a set value to each branch pipe in the tree-shaped spatial node and detect a combined force applied to the tree-shaped spatial node. The method can simultaneously and accurately apply static force to each branch pipe, thereby effectively predicting the overall working condition of the tree-shaped spatial node.

7 Claims, 14 Drawing Sheets

(56) References Cited

FOREIGN PATENT DOCUMENTS

CN 210369065 U 4/2020
CN 220602913 U * 3/2024

OTHER PUBLICATIONS

Tong, Lewei et al., Behavior of multiplanar circular hollow section joints with internal stiffeners, Building Structure, 39(1), 2009, 5 pages.
Jiang, Shuaichen et al., Mechanics Analysis and Test of Long-Span Spatial Truss Structures in Process of Support Removal, Industrial Construction, 49(3): 141-147, 2019.
Shou, Jianjun et al., Performance Research on Large Cast-Steel Node under Complex Stress State, Steel Construction, 26(148). 2011, 4 pages.
Wang, Chengcan et al., A novel preloading method for foundation underpinning for the remodeling of an existing building, Geomechanics and Engineering, 24(1): 29-42, 2021.
First Office Action in Chinese Application No. 202410123548.9 mailed on Mar. 13, 2024, 18 pages.
Notification to Grant Patent Right for Invention in Chinese Application No. 202410123548.9 mailed on Mar. 22, 2024, 4 pages.

* cited by examiner

50

K-type

TT-type

KK-type

TEST METHODS FOR MEASURING FORCE SITUATIONS OF TREE-SHAPED SPATIAL NODES

CROSS-REFERENCE TO RELATED APPLICATION

This application claims priority to Chinese application No. 202410123548.9, filed on Jan. 30, 2024, the entire contents of which are hereby incorporated herein by reference.

TECHNICAL FIELD

The present disclosure relates to the technical field of engineering structural testing, and in particular, to a test method for measuring a force situation of a tree-shaped spatial node.

BACKGROUND

With the development and application of steel structures in construction engineering, the roofs of large public buildings, such as stadiums or airports, are constructed using spatial steel structures. These structures are supported by multiple cast steel nodes, enabling them to stand securely on the ground.

Cast steel nodes are a type of tree-shaped spatial node. Under actual loading conditions, the cast steel nodes experience complex internal stresses due to multiple external forces, making calculations quite challenging. The branch pipes of the cast steel nodes have complex shapes and are located at different positions. As these branch pipes converge on the main pipe, some experience tension while others are compressed, resulting in varying force states of each of the branch pipes at the same time and forces from the branch pipes to the main pipe being different. This variation makes it difficult for existing testing equipment to accurately perform force detection on each branch pipe simultaneously, thus failing to effectively replicate the actual working conditions of the cast steel nodes.

Because the main pipe of the tree-shaped spatial node accumulates loads from each branch pipe, it requires a significant counterforce. This creates considerable difficulty in fabricating a complete steel reaction frame, resulting in larger steel beams at the base of the frame, increasing the amount of steel used and impacting the safety of the test.

SUMMARY

In order to avoid and overcome technical problems in the prior art, some embodiments of the present disclosure may provide a reaction frame device for measuring a force situation of a tree-shaped spatial node and a test method thereof. Some embodiments of the present disclosure may provide a reaction frame device that can effectively and accurately apply static force on various branch pipes in the tree-shaped spatial node, thereby effectively predicting the overall working condition of the tree-shaped spatial node.

In order to realize the above purposes, some embodiments of the present disclosure may provide following technical solutions:

a test method for measuring a force situation of a tree-shaped spatial node, comprising:

S1, constructing a raft foundation, and arranging an upper face of the raft foundation horizontally, and installing a reaction frame on the raft foundation;

S2, manufacturing a corresponding tree-shaped spatial node scaled down proportionally according to a specific structure and a force situation of a space steel structure, and calculating a corresponding force situation of each branch pipe in the tree-shaped spatial node according to a result of proportional scaling;

S3, mounting the tree-shaped spatial node on the reaction frame and the raft foundation;

S4, determining a type of a force measurement assembly corresponding to the each branch pipe according to the force situation of the each branch pipe, and installing the determined force measurement assembly at a corresponding position on the reaction frame; and S5: simultaneously activating each force measurement assembly to apply a force to the each branch pipe according to the force situation of the each branch pipe, and adjusting a force value in real-time through a load sensor to restore a force state of the tree-shaped spatial node.

In some embodiments, the reaction frame device may include the raft foundation, the reaction frame may be fixedly installed on the raft foundation, and a cavity may be formed inside the reaction frame to accommodate the tree-shaped spatial node.

The tree-shaped spatial node may be arranged in the cavity, and a main pipe of the tree-shaped spatial node may be plumb-fastened to the raft foundation, the force measurement assembly may be arranged in an upper space of the cavity, the force measurement assembly may be configured to simultaneously apply a force of a set value to the each branch pipe in the tree-shaped spatial node along an axial direction of the each branch pipe and may detect a combined force applied to the tree-shaped spatial node.

In some embodiments, the reaction frame may include crossbeams arranged horizontally along a length direction of the crossbeams, each crossbeam of the crossbeams may join end to end to form a loop; at least two sets of columns may be arranged sequentially on a lower ring surface of the loop along a circumferential direction of the loop, bottoms of the columns may be fixedly connected to the raft foundation, and the columns may be constructed to suspend the loop above the raft foundation.

In some embodiments, a space below the loop may constitute the cavity for accommodating the tree-shaped spatial node; the reaction frame may further include an auxiliary positioning frame, the auxiliary positioning frame being arranged at a bottom of the cavity and configured to position the tree-shaped spatial node along a horizontal direction.

The auxiliary positioning frame may include a locking sleeve coaxially arranged on the main pipe of the tree-shaped spatial node, an outer side of the locking sleeve may be equipped with positioning beams, the positioning beams being arranged sequentially along a circumferential direction of the locking sleeve and a count of the positioning beams being matched with a count of the columns; the positioning beams may be horizontally arranged along a length direction of the positioning beams and one end of each of the positioning beams may be fixedly connected to a corresponding column.

In some embodiments, the force measurement assembly may include a pressure assembly and a tension assembly.

The pressure assembly may include a head plate coaxially fixed on a pipe end of the branch pipe and a positioning sleeve coaxially socketed and locked on the crossbeam, a pressure telescopic rod may be installed between the positioning sleeve and the head plate, the pressure telescopic rod being coaxially arranged with the branch pipe and configured to apply pressure to the head plate along a horizontal direction; the load sensor may be arranged compactly between a telescopic end of the pressure telescopic rod and a disk surface of the head plate, the load sensor being configured to measure pressure exerted by the pressure telescopic rod.

The tension assembly may include the head plate coaxially fixed on the pipe end of the branch pipe and the positioning sleeve coaxially socketed and locked on the crossbeam; a penetrating telescopic rod may be disposed on a side of the positioning sleeve away from the head plate, an axis of the penetrating telescopic rod may coincide with an axis of the branch pipe; a tail end of a steel stranded rope may be fixed to the head plate, a front end of the steel stranded rope may pass through the positioning sleeve and the crossbeam in turn, and pass out of the penetrating telescopic rod through an axial hole of the penetrating telescopic rod; the front end of the steel stranded rope and a position-limiting plate may be fixedly connected to each other; a telescopic end of the penetrating telescopic rod may be pressed against the position-limiting plate to tension the steel stranded rope along the axis of the branch pipe; and the load sensor may also be clamped between the telescopic end of the penetrating telescopic rod and the position-limiting plate, the load sensor being configured to measure pressure exerted by the penetrating telescopic rod.

In some embodiments, the positioning sleeve may be coaxially and slidably arranged on the crossbeam, and at least two sets of positioning screw holes may be sequentially provided on an outer surface of the positioning sleeve along an axial direction of the positioning sleeve, and a positioning bolt may be tightened inside each of the at least two sets of positioning screw holes, and a front end of the positioning bolt may be pressed against the crossbeam to lock the positioning sleeve.

In some embodiments, the positioning sleeve may be equipped with a positioning plate whose surface is parallel to the disk surface of the head plate, the pressure telescopic rod and the penetrating telescopic rod may be both plumb-fastened to a corresponding positioning plate.

In some embodiments, the front end of the steel stranded rope may pass through the position-limiting plate and may be coaxially socketed inside a locking buckle, the locking buckle may constitute a rope joint structure to avoid the position-limiting plate moving towards the front end of the steel stranded rope.

In some embodiments, the raft foundation may be a reinforced concrete structure including two main beams and one secondary beam, the two main beams being arranged at ends of the secondary beam, respectively, to form a beam-slab structure in conjunction with the secondary beam.

The concrete structure of the raft foundation may include two sets of transversely-placed main beam reinforcement cages, a transversely-placed secondary beam reinforcement cage, and at least two sets of J-type column base anchor bolts.

Each of the at least two sets of J-type column base anchor bolts may include at least two J-type anchor hooks; anchor hooks in the same set of the J-type column base anchor bolt may be uniformly and sequentially distributed along a set circumferential direction to form a cylindrical reinforcement cage.

A bottom of each of the at least two sets of J-type anchor hooks may be hooked from bottom to up to a longitudinal bar of a corresponding reinforcement cage, and a top of each of the at least two sets of the J-type anchor hooks may extend upward through concrete along a plumb direction to form an anchor bolt.

In some embodiments, a bottom of the main pipe that is coaxially socketed to the locking sleeve may be fixedly connected to a second flange, and the second flange may be fixedly mounted to the raft foundation through the anchor bolt underneath the main pipe; and a bottom of each column may be fixedly connected to a first flange, and the each column may be fixedly connected on the raft foundation through a cooperation between the first flange and a corresponding anchor bolt.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

Numbers in the figures denote:
10, raft foundation; 11, main beam reinforcement cage; 12, secondary beam reinforcement cage; 13, J-type column base anchor bolt; 131, anchor hook;

20, reaction frame; 21, crossbeam; 22, column; 221, first flange; 23, tie beam; 24, auxiliary positioning frame; 241, positioning beam; 242, locking sleeve; 25, ball node; 26, node mounting member; 261, lower plate; 262, upper plate; 263, connection bolt;

30, tree-shaped spatial node; 31, main pipe; 32, branch pipe; 33, second flange;

40, force measurement assembly; 401, positioning rod; 402, head plate; 403, connection base; 404, load sensor; 405, positioning sleeve; 4051, positioning screw hole; 4052, positioning bolt; 406, positioning plate; 41, tension assembly; 411, steel stranded rope; 412, penetrating telescopic rod; 413, position-limiting plate; 414, locking buckle; 42, pressure assembly; 421, pressure telescopic rod;

50, steel structure node; 51, main pipe of steel structure node;

60, axis adjustment device; 61, L-type plate; 62, adjustment bolt.

DETAILED DESCRIPTION

The technical solutions in some embodiments of the present disclosure will be clearly and completely described below in conjunction with the accompanying drawings in some embodiments of the present disclosure, and it is clear that the embodiments described are only a part of the embodiments of the present disclosure and not all of the embodiments. Based on the embodiments in the present disclosure, all other embodiments obtained by a person of ordinary skill in the art without making creative labor fall within the scope of protection of the present disclosure.

In actual engineering applications, various branch pipes on a cast steel node interact with each other in the process of stress, and the various branch pipes transmit a combined force to a main pipe, and the main pipe bears the effect of the combined force. While the above prior art is capable of detecting stress on each branch pipe on the cast steel node by a stress testing device, it is not capable of detecting a force situation on each branch pipe at the same time, which makes it difficult to obtain a force situation of the main pipe when each branch pipe is simultaneously stressed, so that a working state of the cast steel node may not be estimated. Since it is difficult to accurately predict whether the working state of the cast steel node is within a safety limit, which leads to the impossibility of formulating a safe and effective countermeasure strategy, there is a huge safety hazard in the engineering application. Therefore, it is desired to solve such a hazard with the embodiments of the present disclosure.

Figure 1:
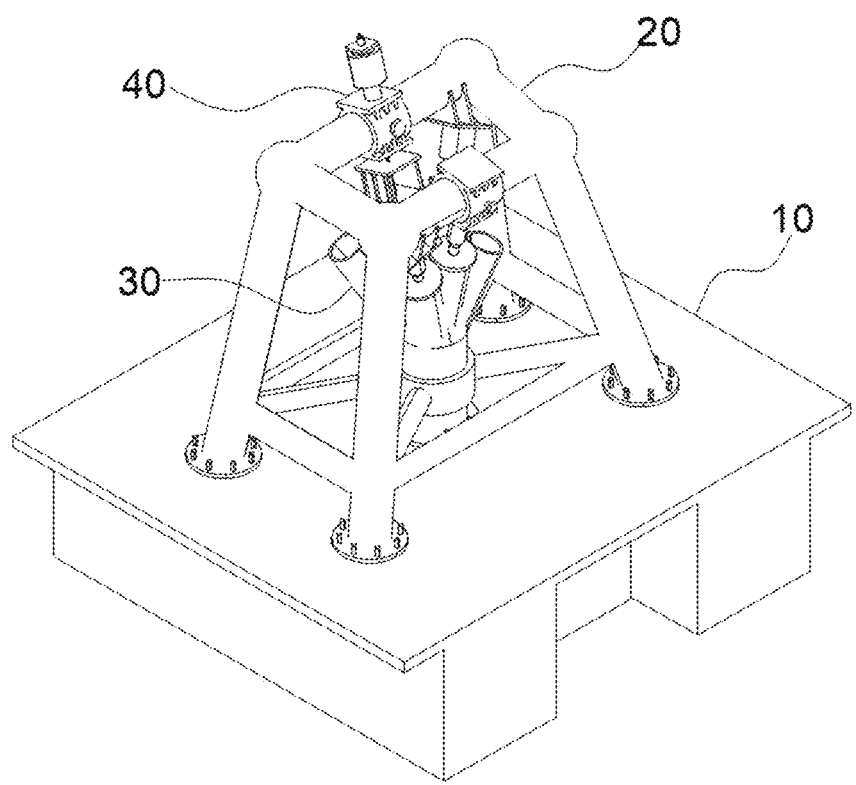
FIG. 1 is a schematic diagram illustrating an exemplary overall structure of a reaction frame device according to some embodiments of the present disclosure.
Figure 2:
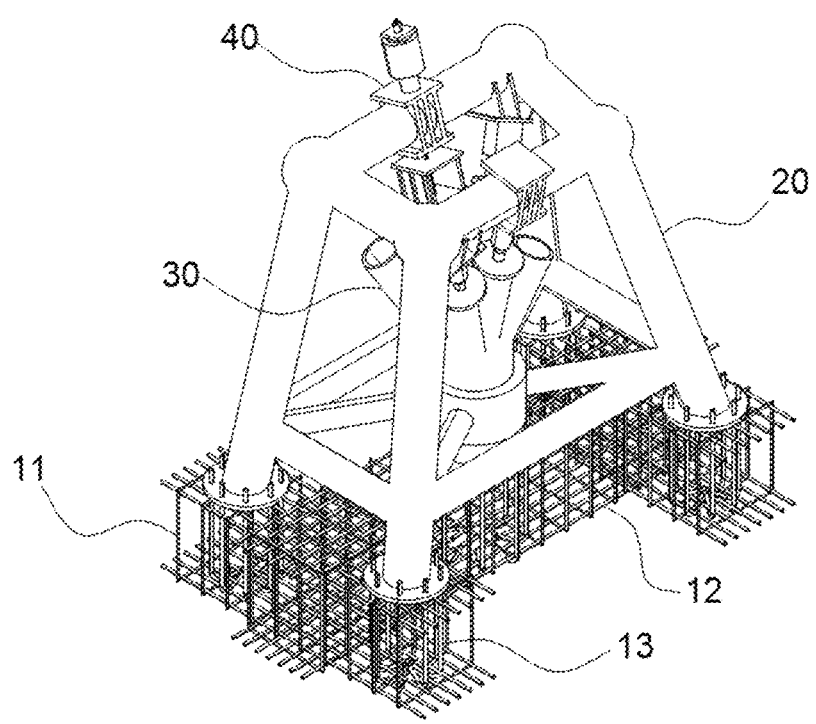
FIG. 2 is a schematic diagram illustrating an exemplary overall structure of an exposed reinforcement structure according to some embodiments of the present disclosure.
Figure 3:
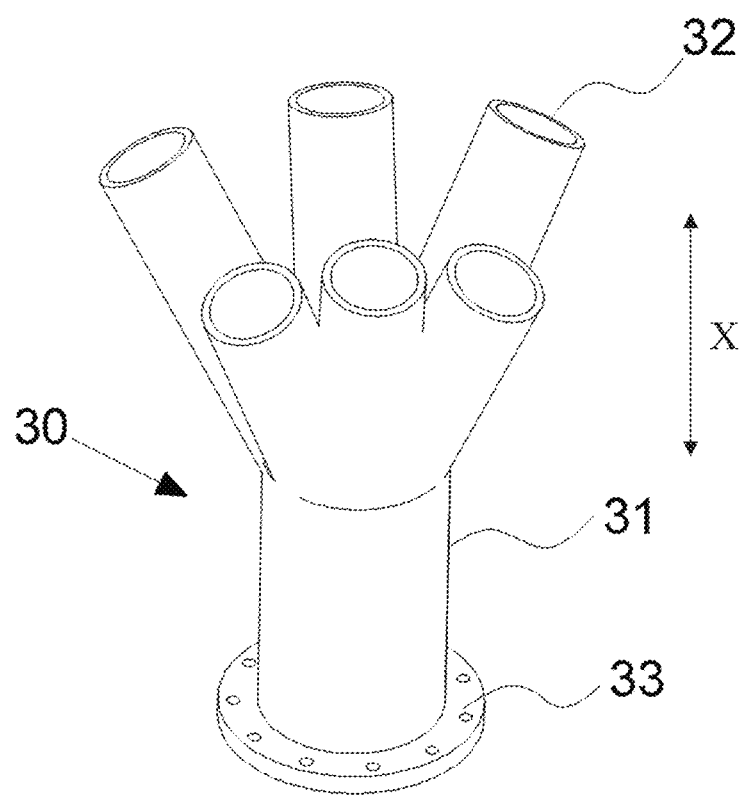
FIG. 3 is a schematic diagram illustrating an exemplary structure of a tree-shaped spatial node according to some embodiments of the present disclosure.
Figure 4:
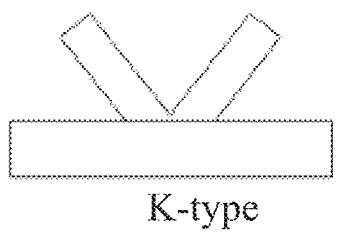
FIG. 4 is a schematic diagram illustrating an exemplary structure of a steel structure node according to some embodiments of the present disclosure.
Figure 4:
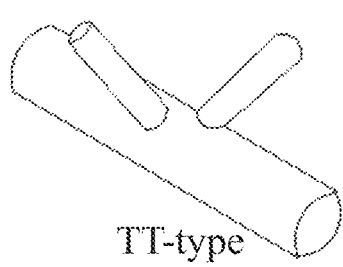
Figure 4:
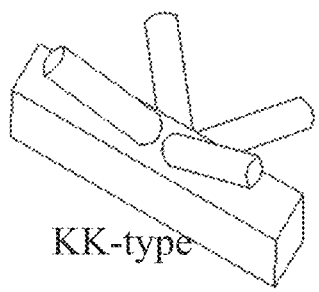
Figure 5:
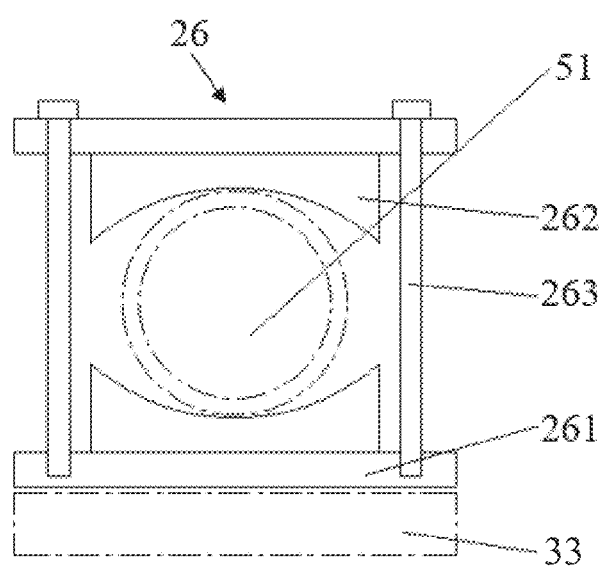
FIG. 5 is a schematic diagram illustrating an exemplary structure of a node mounting member according to some embodiments of the present disclosure.
Figure 6:
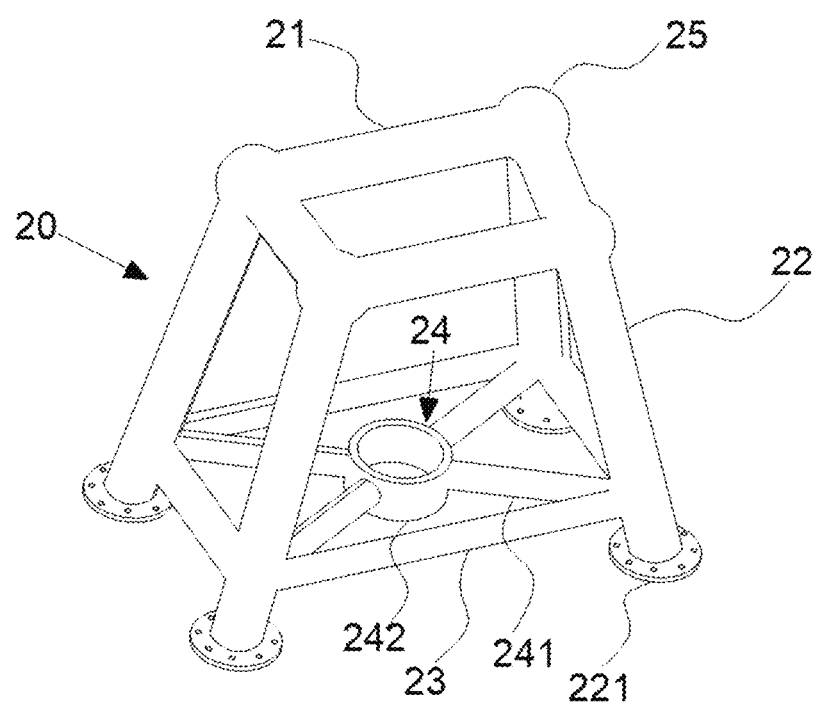
FIG. 6 is a schematic diagram illustrating an exemplary structure of a reaction frame according to some embodiments of the present disclosure.
Figure 7:
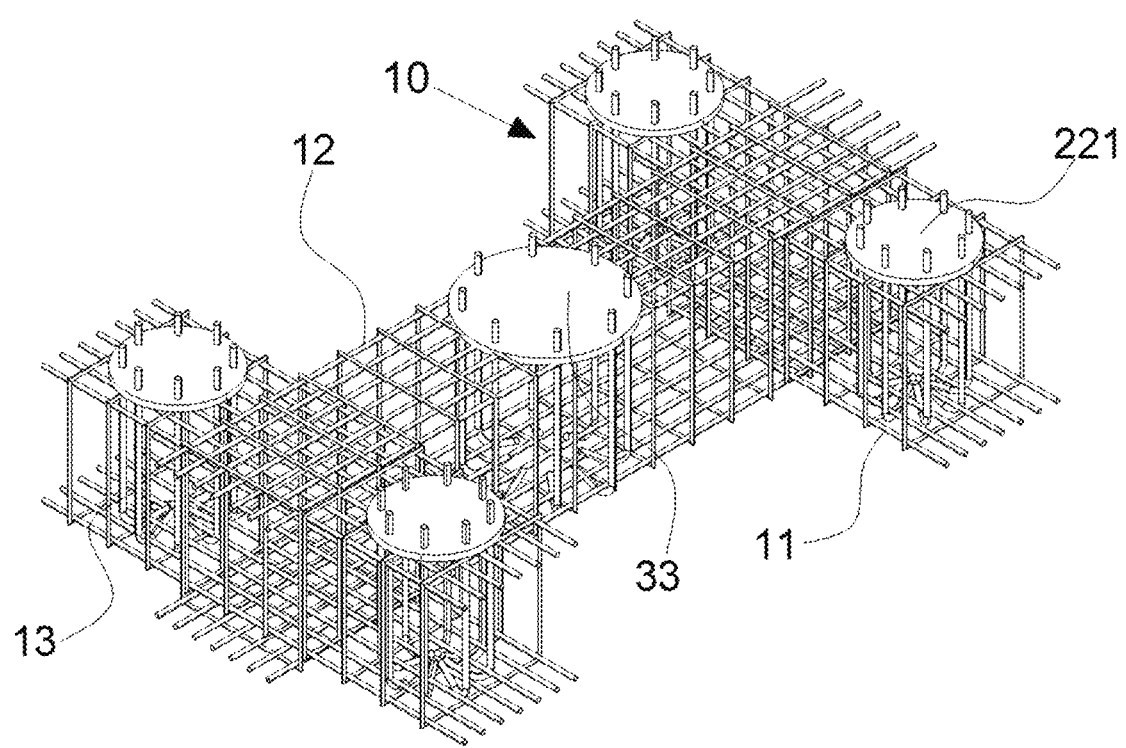
FIG. 7 is a schematic diagram illustrating an exemplary reinforcement structure of a raft foundation according to some embodiments of the present disclosure.
Figure 8:
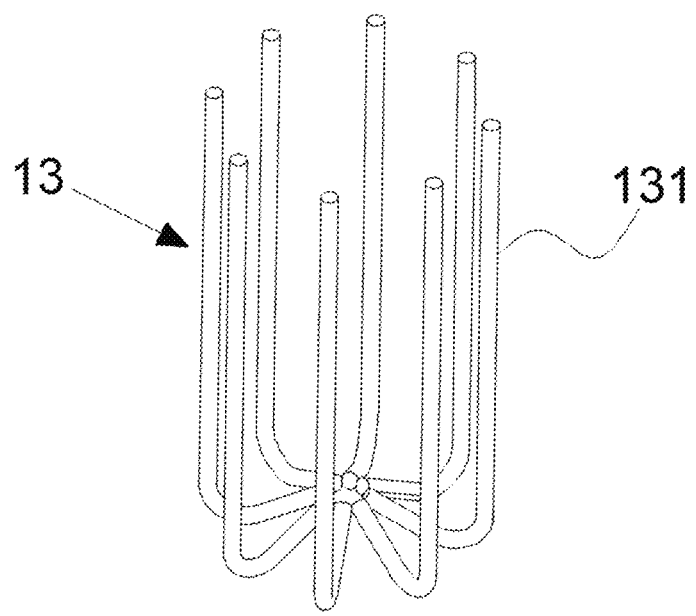
FIG. 8 is a schematic diagram illustrating an exemplary structure of a J-type column base anchor bolt according to some embodiments of the present disclosure.

FIG. 1 is a schematic diagram illustrating an exemplary overall structure of a reaction frame device according to some embodiments of the present disclosure; FIG. 2 is a schematic diagram illustrating an exemplary overall structure of an exposed reinforcement structure according to some embodiments of the present disclosure; FIG. 3 is a schematic diagram illustrating an exemplary structure of a tree-shaped spatial node according to some embodiments of the present disclosure; FIG. 4 is a schematic diagram illustrating an exemplary structure of a steel structure node according to some embodiments of the present disclosure; FIG. 5 is a schematic diagram illustrating an exemplary structure of a node mounting member according to some embodiments of the present disclosure; FIG. 6 is a schematic diagram illustrating an exemplary structure of a reaction frame according to some embodiments of the present disclosure; FIG. 7 is a schematic diagram illustrating an exemplary reinforcement structure of a raft foundation according to some embodiments of the present disclosure; and FIG. 8 is a schematic diagram illustrating an exemplary structure of a J-type column base anchor bolt according to some embodiments of the present disclosure.

As shown in FIG. 1 to FIG. 8, a tree-shaped spatial node 30 may include a straight cylindrical main pipe 31, a plurality of straight cylindrical branch pipes 32 that are fixedly mounted at a top of the main pipe 31, and each branch pipe 32 may be tilted upwardly or in a plumb arrangement, so a dendritic structure may be formed at the top of the main pipe 31. The tree-shaped spatial node 30 may be used to connect and support columns 22 and crossbeams 21 in a frame structure. The main pipe 31 may be a member that is arranged in a plumb manner and may be secured to steel and concrete columns pre-buried in the soil. The branch pipe 32 may be a member that is secured in sequence with each connection end in the frame structure, correspondingly.

In some embodiments, there is also a second flange 33 coaxially welded to the bottom of the main pipe 31 to mount the tree-shaped spatial node 30 on a raft foundation 10 through a conventional flange connection manner. More information on the raft foundation may be found in a later description.

In some embodiments, a length, a diameter, and an inclination angle of each branch pipe 32 may be the same, or there may be different. A diameter of the main pipe 31 may be typically larger than the diameter of the each branch pipe 32 to facilitate a higher support force for the branch pipe 32.

In a conventional design process, the main pipe 31 and the branch pipe 32 may be usually made of cast steel material. During a casting process, a casting model may be constructed in advance according to design requirements, and then the cast material may be poured into the casting model, and the complete tree-shaped spatial node 30 may form when the cast material is cooled and shaped.

The tree-shaped spatial node 30 may be typically used as a support leg to provide a stable and reliable support for some large frame structures to stand safely on the ground. In some embodiments, each branch pipe 32 in the tree-shaped spatial node 30 may be fixedly connected to each connection end in the frame structure in a sequence, respectively. Meanwhile, the main pipe 31 may be arranged in a plumb manner and solidly coupled to steel and concrete columns pre-buried in the soil to form the support leg for the frame structure. The steel and concrete columns may be concrete columns with rebar as a skeleton. A fixed connection may be to connect fixedly, which refers to a connection with no relative motion between parts. Exemplary fixed connections may include welding, a threaded connection, riveting, etc.

In some embodiments, the tree-shaped spatial node 30 may be molded using an integral casting, which has high stiffness and good integrity, excellent fatigue as well as seismic performance, and good workability and adaptability, and may be processed to produce a complex and varied shape according to the needs of the building.

In some embodiments, the tree-shaped spatial node 30 may be a steel structure node 50. A reaction frame 20 may include a node mounting member 26, the node mounting member 26 being constructed to mount the steel structure node 50. More information on the reaction frame may be found in the later description.

The steel structure node 50 refers to a planar node or a spatial node in other forms. For example only, as shown in FIG. 4, the steel structure node 50 may include a planar node such as a K-type or a spatial node such as a TT-type or a KK-type.

In some embodiments, the tree-shaped spatial node 30 may be the steel structure node 50 when the main pipe 31 is set parallel to the raft foundation 10 and the branch pipe 32 does not contact the raft foundation 10.

The node mounting member 26 may be a structural member for mounting the steel structure node 50. In some embodiments, the node mounting member 26 may include a lower plate 261, an upper plate 262, and a connection bolt 263, as illustrated in FIG. 5.

The lower plate 261 and the upper plate 262 refer to a structure to secure the main pipe 51 of the steel structure node 50. The upper plate 262 may be located directly above the lower plate 261, which is fixedly connected to the second flange 33. More information on the second flange can be found in a later description.

In some embodiments, both the lower plate 261 and the upper plate 262 may be provided with a curved surface that is adapted to an outer contour of the main pipe 51 of the steel structure node 50, so as to accommodate main pipes 51 of different diameters of the steel structure node 50 while better securing the main pipe 51 of the steel structure node 50. Understandably, when the main pipe 51 of the steel structure node 50 is a square pipe, the lower plate 261 and the upper plate 262 may be provided with a concave groove, accordingly.

The connection bolt 263 refers to an element for connecting the lower plate 261 to the upper plate 262. In some embodiments, the node mount member 26 may include at least four connection bolts 263. The at least four connection bolts 263 may fit one by one with at least four threaded holes disposed on a left side and a right side of the lower plate 261 and the upper plate 262, respectively, to realize a fixed connection between the lower plate 261 and the upper plate 262.

In actual use, for example, when the steel structure node 50 is a K-type planar node or a TT-type spatial node as shown in FIG. 4, the main pipe 51 of the steel structure node 50 may be secured to the raft foundation 10 by using two node mounting members 26. For example only, two second flanges 33 may be provided on the raft foundation 10, lower plates 261 of the two node mounting members 26 may be fixedly connected to the two second flanges 33, respectively, and two ends of the main pipe 51 of the steel structure node 50 may be arranged between the lower plate 261 and the upper plate 262 of each of the two node mounting members 26, respectively, and the main pipe 51 may be fixed to the raft foundation 10 by tightening the connection bolt 263.

In some embodiments, when the tree-shaped spatial node 30 is the steel structure node 50, an auxiliary positioning frame 24 may be replaced with the node mounting member 26 to expand the application of a test method, for example, it may be extended to test planar nodes or spatial nodes of K-type, TT-type, KK-type, etc.

The raft foundation 10 may be a form of building foundation used to carry building loads and form a raft base. In some embodiments, the raft foundation 10 may be a reinforced concrete structure including two main beams and a secondary beam, the two main beams being arranged at two ends of the secondary beam to form an H-type beam structure. The H-type beam structure may be capable of reducing a volume of the reinforced concrete structure while meeting a test strength requirement, avoiding using large volume and deep foundations.

In some embodiments, as shown in FIG. 2 and FIG. 7, a reinforcement structure in the raft foundation 10 may include a main beam reinforcement cage 11, a secondary beam reinforcement cage 12, and a J-type column base anchor bolt 13. A structure of the main beam reinforcement cage 11 and the secondary beam reinforcement cage 12 may be the same as a conventional reinforcement cage structure, in which a plurality of sets of ring bars are surrounded outside a plurality of transversely-placed longitudinal bars, and in turn forms a transversely-placed rectangular reinforcement cage.

In some embodiments, the raft foundation 10 may include two sets of main beam reinforcement cages 11 and a secondary beam reinforcement cage 12, and the two sets of main beam reinforcement cages 11 may be arranged at two ends of the secondary beam reinforcement cage 12, which in turn form an H-type reinforcement cage structure.

In some embodiments, a total of five sets of J-type column base anchor bolts 13 may be used in the raft foundation 10, four sets of which may be used to secure four columns 22 of the reaction frame 20, and a remaining set of which may be used to secure the main pipe 31 of the tree-shaped spatial node 30.

In some embodiments, for the J-type column base anchor bolt 13 for securing the column 22, each J-type column base anchor bolt 13 may be installed at an end of the main beam reinforcement cage 11 and may be connected to the main beam reinforcement cage 11 by a conventional cage preparation manner. In some embodiments, the J-type column base anchor bolt 13 may include a plurality of J-type anchor hooks 131, as shown in FIG. 7 and FIG. 8. Each anchor hook 131 within the same J-type column base anchor bolt 13 may be arranged sequentially and uniformly around an axis of a first flange 221 in the reaction frame 20 to form a cylindrical reinforcement cage structure. And each anchor hook 131 in the reinforcement cage structure and a bottom bar of the main beam reinforcement cage 11 may be screwed together with each other using wires, so as to secure the J-type column base anchor bolt 13 to an end portion of the main beam reinforcement cage 11, thereby realizing the positioning and compression transmission of the reaction frame 20.

By connecting the reaction frame 20 and the raft foundation 10 as a whole by means of the J-type column base anchor bolt 13, the reaction frame 20 can accurately transfer a tension force to the main beam during testing to cause an upward tendency at two ends of the main beam, which in turn enables the main beam to generate a corresponding upward bending moment.

In some embodiments, for the J-type column base anchor bolt 13 for securing the tree-shaped spatial node 30, the J-type column base anchor bolt 13 may be mounted in the middle of the secondary beam reinforcement cage 12, which is also connected to the secondary beam reinforcement cage 12 by a conventional reinforcement cage preparation manner. In some embodiments, each anchor hook 131 within the J-type column base anchor bolt 13 may be disposed sequentially and uniformly around an axis of the second flange 33 in the tree-shaped spatial node 30. The each anchor hook 131 in the J-type column base anchor bolt 13 and a bottom bar of the secondary beam reinforcement cage 12 may be screwed to each other using wires, to secure the J-type column base anchor bolt 13 to an end portion of the secondary beam reinforcement cage 12.

In some embodiments, as shown in FIG. 8, the anchor hook 131 of a J-type may include two portions: a straight section and a bent section, with the bent section being attached to a bottom of the straight section, which in turn constitutes an integrally molded J-type anchor hook 131 that may be formed by bending a steel bar. The anchor hook 131 may be provided with external threads on a top outer circumference to form a threaded section. The bent section at a bottom of the anchor hook 131 may be bent inwardly and hooked to the bottom bar of the main beam reinforcement cage 11 or the bottom bar of the secondary beam reinforcement cage 12 from bottom to up, to increase the pull-out resistance of the anchor hook 131.

In some embodiments, a process of constructing the raft foundation 10 may include excavating a pit according to the design, then erecting a brick mold in the pit, and then dimensions of each reinforcement cage in the raft foundation 10 are adjusted according to a dimension of the reaction frame 20 and a dimension of the tree-shaped spatial node 30. The individual reinforcing cages are prepared in the brick mold, and then concrete slurry may be poured into the brick mold and the concrete slurry may be covered to submerge the reinforcing cages, and then the concrete slurry may be waited to solidify, and then the construction of the raft foundation 10 may be completed. The brick mold may be free of dismantling to avoid excavating a larger pit, which reduces the intensity of work and the cost of testing.

An upper end surface of the raft foundation 10 may need to be treated by the construction process after the concrete is poured so that an upper slab surface of the raft foundation 10 is a horizontal plane. This ensures that both the tree-shaped spatial node 30 and the reaction frame 20 mounted on the raft foundation 10 may meet the flatness requirement, and a direction of the combined force on the main pipe 31 may be distributed along a vertical direction. The construction process refers to determining specific construction manners and steps for each construction process according to the construction requirements. Exemplary construction processes may include mortar application, leveling, and compaction, or the like. In some embodiments, the vertical direction may be represented by an X-direction indicated by an arrow in FIG. 3.

Before pouring the concrete slurry, it may be necessary to preset a protrusion length of a tip of the anchor hook 131 in advance so that after the concrete slurry sets, an exposed length of the tip of the anchor hook 131 may meet the requirements for securing the first flange 221 and the second flange 33.

The reaction frame 20 may be used to support a building structure or other frame structure. In some embodiments, the reaction frame 20 may be a hollow hexahedral frame made of a plurality of beams that are connected to each other in sequence, with each beam constituting a corresponding side of the hexahedral frame. Four intersections located on a same plane may constitute support points between the reaction frame 20 and the ground. The first flange 221 may be fastened at the support point, and the reaction frame 20 may be secured to the raft foundation 10 through the connection between the anchor hook 131 pre-buried in the raft foundation 10 to the first flange 221 for a next test operation.

In some embodiments, the reaction frame 20 may be designed in a variety of shapes. For illustrative purposes only, as shown in FIG. 6, the reaction frame 20 may be a hollow four-pronged frame with a small top and a large bottom, and a bottom surface of the four-pronged frame may be rectangular, a top surface of the four-pronged frame may be trapezoidal, and the top surface may be arranged at an angle toward a top edge of the trapezoid.

Four beams on the top surface of the four-pronged frame may be referred to as crossbeams 21, and four beams on the sides of the four-pronged frame may be referred to as columns 22, and four beams on the bottom surface of the four-pronged frame may be referred to as tie beams 23. In some embodiments, whether to install the tie beam 23 depends on the actual situation.

Figure 11:
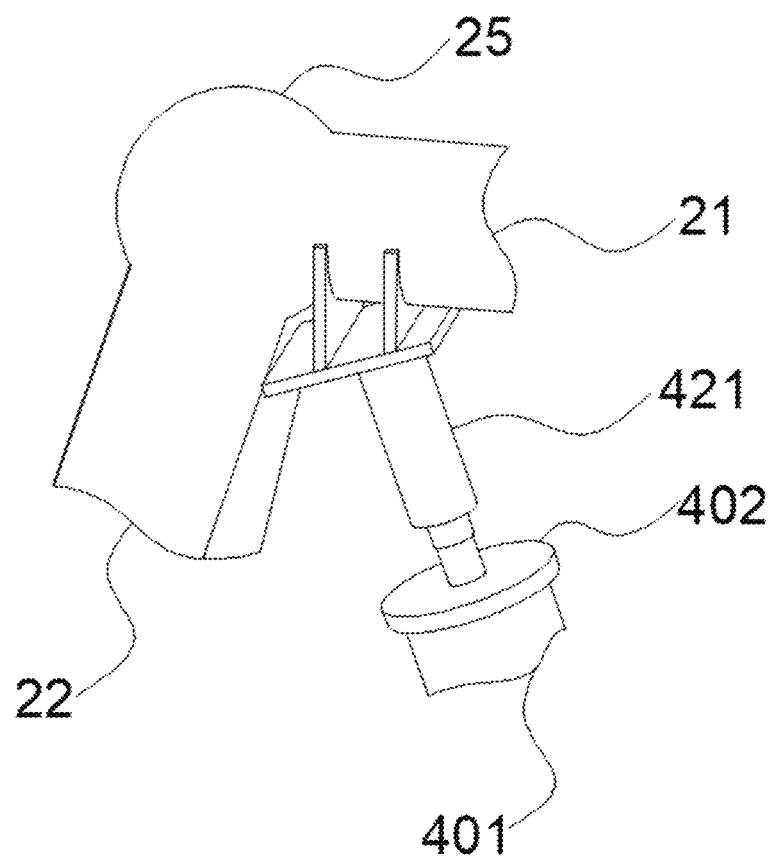
FIG. 11 is a schematic diagram illustrating a mounting structure of the pressure assembly at a ball node according to some embodiments of the present disclosure.

In some embodiments, the crossbeams 21 and the columns 22 at four corners of the top surface of the four-pronged frame may be fixedly connected to each other by ball nodes 25 (as shown in FIG. 11). Ends of the tie beams 23 at four corners of the bottom surface of the four-pronged frame may be fixedly connected to a body of the columns 22, and a bottom end of the column 22 may extend downwardly along an axis of the column 22 for a short length. The bottom end of the column 22 may be horizontally notched, and at the bottom end of the column 22, a horizontally arranged first flange 221 may be fixedly mounted concentrically through welding, to facilitate securing the reaction frame 20 to the raft foundation 10 through the first flange 221.

In some embodiments, the auxiliary positioning frame 24 of an X-type may be arranged within the reaction frame 20, with each of the four ends of the auxiliary positioning frame 24 being secured to each of the four intersections at the bottom surface of the reaction frame 20.

The auxiliary positioning frame 24 may be a structural member for providing auxiliary positioning for the main pipe 31 of the tree-shaped spatial node 30. In some embodiments, the auxiliary positioning frame 24 may include a locking sleeve 242 that may be socketed onto the body of the main pipe 31 of the tree-shaped spatial node 30. Four positioning beams 241 may be arranged on an outer wall of the locking sleeve 242 in sequence along a circumference of the locking sleeve 242. One end of the positioning beam 241 may be fixed to an adjacent intersection on the bottom surface, thereby locking the main pipe 31 of the tree-shaped spatial node 30 within the bottom surface and avoiding the main pipe 31 from moving horizontally to eliminate the effect of shear stress on the main pipe 31.

After the raft foundation 10 has been set up, the reaction frame 20 may be first lifted to a mounting position on an upper end surface of the raft foundation 10 arranged horizontally, a through-hole on the first flange 221 in the reaction frame 20 may be aligned with a top end of the anchor hook 131, and the threaded section at the top end of the anchor hook 131 may be inserted into the through-hole, then a fastening nut may be tightened on the anchor hook 131 to stably fix the reaction frame 20 on the raft foundation 10.

When the fixing of the reaction frame 20 is completed, installation of the tree-shaped spatial node 30 may begin. First, the second flange 33 may be mounted on a corresponding anchor bolt, then the main pipe 31 of the tree-shaped spatial node 30 may be coaxially passed through the locking sleeve 242, so that a bottom end of the main pipe 31 may be coaxially pressed against an upper disk surface of the second flange 33 and the bottom end of the main pipe 31 and the second flange 33 may be welded to each other, and then the second flange 33 may be fixed to the raft foundation 10 through a fastening nut. At this time, an axis of the locking sleeve 242, an axis of the cylindrical reinforcement cage and an axis of a positioning ring, and an axis of the main pipe 31 may be all arranged coaxially. When choosing the locking sleeve 242, a diameter of the chosen locking sleeve 242 may need to match with the diameter of the main pipe 31. In this way, when the branch pipe 32 may be socketed within the locking sleeve 242, an outer wall of the main pipe 31 and an inner wall of the locking sleeve 242 may be closely adhered to each other, thus preventing the main pipe 31 from moving horizontally. Therefore, when the tree-shaped spatial node 30 is subjected to horizontal force, the tip of the anchor hook 131 can avoid shearing due to horizontal displacement, thereby enhancing the safety of the test process.

After the tree-shaped spatial node 30 is installed, the tree-shaped spatial node 30 may be located in a space within the reaction frame 20, at which point a force measurement assembly for providing a test force may be installed between each branch pipe 32 and the reaction frame 20.

Figure 9:
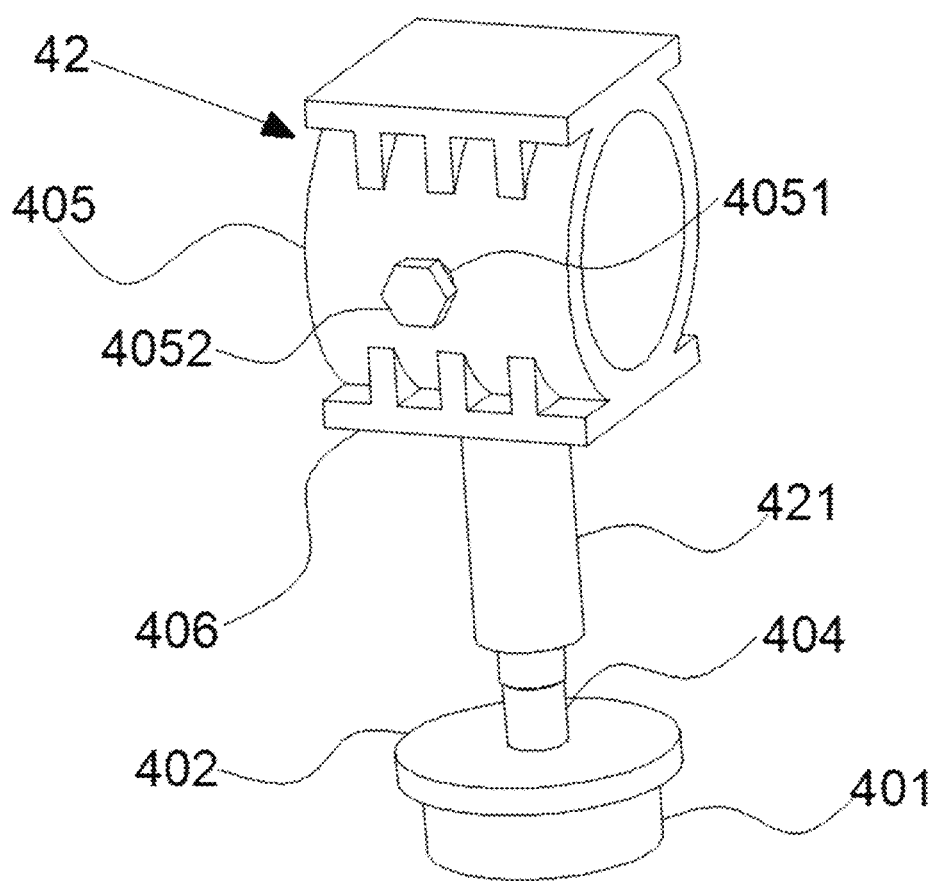
FIG. 9 is a schematic diagram illustrating an exemplary structure of a pressure assembly according to some embodiments of the present disclosure.
Figure 10:
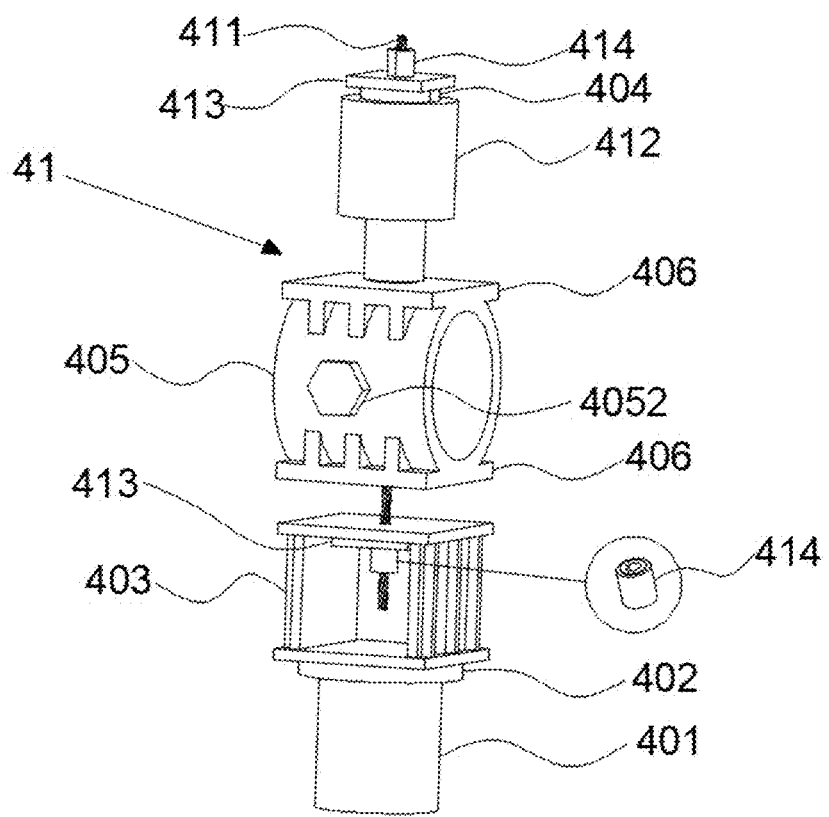
FIG. 10 is a schematic diagram illustrating an exemplary structure of a tension assembly according to some embodiments of the present disclosure.

FIG. 9 is a schematic diagram illustrating an exemplary structure of a pressure assembly according to some embodiments of the present disclosure; FIG. 10 is a schematic diagram illustrating an exemplary structure of a tension assembly according to some embodiments of the present disclosure; and FIG. 11 is a schematic diagram illustrating an exemplary structure of a pressure assembly installed at a ball node according to some embodiments of the present disclosure.

A force measurement assembly 40 refers to an assembly configured to measure a stress applied to the branch pipe 32. In some embodiments, as shown in FIG. 9 and FIG. 10, the force measurement assembly 40 may include two types: a tension assembly 41 and a pressure assembly 42. The tension assembly 41 may be used to provide a tension to the branch pipe 32. The pressure assembly 42 may be used to provide a pressure to the branch pipe 32.

In some embodiments, as shown in FIG. 9 and FIG. 11, the pressure assembly 42 may include a positioning rod 401 whose front end may be coaxially inserted into a straight rod, and a disk-shaped head plate 402 may be coaxially connected to a tail end of the positioning rod 401 in a fixation manner. The head plate 402 may be pressed against a pipe end of the branch pipe 32 to prevent the positioning rod 401 from further protruding into the branch pipe 32. A shape of the head plate 402 may be not limited, and in addition to being designed in the form of a disk, it may also be designed in the form of a rectangle, or the like.

In some embodiments, the pressure assembly 42 may further include a positioning sleeve 405 that is coaxially socketed to the crossbeam 21 or the column 22 of the reaction frame 20, as illustrated in FIG. 9.

The positioning sleeve 405 may be a structural member of the force measurement assembly 40 configured to secure the reaction frame 20. In some embodiments, an inner diameter of the positioning sleeve 405 may be slightly larger than a diameter of a corresponding crossbeam 21 or a diameter of a corresponding column 22. With such setup, when the positioning sleeve 405 is socketed to the crossbeam 21 or the column 22, the positioning sleeve 405 may rotate around the axis of the crossbeam 21 or the column 22, and may slide back and forth along an axial direction of the crossbeam 21 or the column 22 to adjust a position of the positioning sleeve 405, thereby facilitating accurate force measurement.

In some embodiments, as shown in FIG. 9, the pressure assembly 42 may further include a pressure telescopic rod 421, with a telescopic direction of the pressure telescopic rod 421 and an axial direction of a corresponding branch pipe 32 coinciding with each other. A fixation end of the pressure telescopic rod 421 may be fixedly connected to the positioning sleeve 405. A telescopic end of the pressure telescopic rod 421 may be plumb-fastened to a disk surface of the head plate 402, and a load sensor 404 (this load sensor is noted as a first load sensor) may be pressed and arranged between the telescopic end and the disk surface of the head plate 402. The load sensor 404 may be used to measure pressure exerted by the pressure telescopic rod 421 on the head plate 402. Exemplary load sensors 404 may include a strain load sensor, a pressure load sensor, or the like.

In some embodiments, the pressure telescopic rod 421 may employ a jacking jack. In some embodiments, the pressure telescopic rod 421 may also employ any other feasible structure or device, which is not limited by the present disclosure.

In some embodiments, a plurality of positioning screw holes 4051 may be provided on the positioning sleeve 405 along a circumferential direction of the positioning sleeve 405 for the process of applying force by the pressure telescopic rod 421 (e.g., a jacking jack) to be in a relatively stable condition. When the positioning sleeve 405 is rotated and slid to a corresponding position, a threaded connection may be formed between the positioning screw hole 4051 and a positioning bolt 4052, and a front end of the positioning bolt 4052 may be pressed against the body of the crossbeam 21 or the body of an inclined column, which then locks the positioning sleeve 405 to the crossbeam 21 or the column 22. When the positioning sleeve 405 is fixed, the positioning rod 401 may be inserted into a corresponding branch pipe 32, and then the pressure telescopic rod 421 and the load sensor 404 (i.e., the first load sensor) may be installed between the positioning sleeve 405 and the head plate 402, and the telescopic direction of the pressure telescopic rod 421 and an axial direction of a corresponding branch pipe 32 may be made to be coincident with each other, and at this time, a positioning plate 406 whose slab surface may be parallel to a disk surface of a corresponding head plate 402, and then the fixation end of the pressure telescopic rod 421 may be fixedly connected to the slab surface of the positioning plate 406, and at this time, the telescopic direction of the pressure telescopic rod 421 may be plumb to the slab surface of the positioning plate 406.

In actual use, due to varying lengths of branch pipes 32 on the tree-shaped spatial node 30, when a distance between a certain branch pipe 32 and a corresponding positioning plate 406 is greater than an expansion and contraction limit of the pressure telescopic rod 421, it is necessary to fixedly clamp a rectangular connection base 403 between the load sensor 404 (i.e., the first load sensor) and the head plate 402, and the connection base 403 is fixed on the head plate 402 through welding, or the like, and thus the distance between the branch pipe 32 and the corresponding positioning plate 406 may be reduced. The distance may be reduced to be within the expansion and contraction limit of the pressure telescopic rod 421 to allow the pressure telescopic rod 421 to apply pressure to the branch pipe 32 and to measure the pressure using the load sensor 404 (i.e., the first load sensor).

In some embodiments, the tension assembly 41 may also include a positioning rod 401 whose front end may coaxially insert into the straight rod. A disk-shaped head plate 402 may be coaxially secured to a tail end of the positioning rod 401. The head plate 402 may press against a pipe end of the branch pipe 32 to prevent the positioning rod 401 from further protruding into the branch pipe. The head plate 402 may need to be welded to a rod opening of the branch pipe 32 when testing tension. A connection base 403 may be welded on an outer disk surface of the head plate 402, and a through-hole may be provided on an end surface of the connection base 403 away from the head plate 402. A steel stranded rope 411 may be threaded through the through-hole, and a front end of the steel stranded rope 411, after passing through the through-hole, may pass through a position-limiting plate 413 disposed within the connection base 403 again. A locking buckle 414 may be installed at the front end of the steel stranded rope 411 to prevent the steel stranded rope 411 from pulling out of the position-limiting plate 413, thereby enabling the steel stranded rope 411 to be pulled tightly against the connection base 403 along the axial direction of the branch pipe 32, and an axis of the steel stranded rope 411 after straightening and the axis of the branch pipe 32 may coincide with each other.

In some embodiments, the tension assembly 41 may further include a positioning sleeve 405 that is coaxially socketed to the crossbeam 21 or the column 22 of the reaction frame 20. An inner diameter of the positioning sleeve 405 may be slightly larger than a diameter of a corresponding crossbeam 21 or a diameter of a corresponding column 22. With such setup, when the positioning sleeve 405 may be socketed to the crossbeam 21 or the column 22, the positioning sleeve 405 may rotate around an axis of the crossbeam 21 or the column 22 and may slide back and forth along an axial direction of the crossbeam 21 or the column 22, so as to adjust a position of the positioning sleeve 405, thereby facilitating accurate force measurement.

In some embodiments, the tension assembly 41 may further include a penetrating telescopic rod 412, with a telescopic direction of the penetrating telescopic rod 412 coinciding with an axial direction of a corresponding branch pipe 32. A fixation end of the penetrating telescopic rod 412 may be fixedly connected to the positioning plate 406 on the positioning sleeve 405, and the positioning plate 406 and the positioning sleeve 405 in the tension assembly 41 may be connected in the same manner as that of the pressure assembly 42.

In some embodiments, the penetrating telescopic rod 412 may employ a piercing jack. In some embodiments, the penetrating telescopic rod 412 may also employ any other feasible structure or device, which is not limited by the present disclosure.

After the positioning sleeve 405 is installed, a tail end of the steel stranded rope 411 may be sequentially threaded through the positioning sleeve 405 and the fixation end of the penetrating telescopic rod 412 (e.g., the penetrating jack) along an axis of the penetrating telescopic rod 412 until a telescopic end of the penetrating telescopic rod 412. A position-limiting plate 413 and a locking buckle 414 may be mounted in the same manner at the tail end of the steel stranded rope 411, which in turn can transmit a tension to the branch pipe through the steel stranded rope 411 that is extended along the axis of the branch pipe 32 when the penetrating telescopic rod 412 is elongated.

In actual use, the tension exerted by the penetrating telescopic rod 412 on the branch pipe 32 may be tested by clamping and mounting a load sensor 404 (this load sensor is noted as a second load sensor) between the fixation end of the penetrating telescopic rod 412 and the connection base 403.

In some embodiments, the locking buckle 414 may employ an annular sleeve tube, when socketed to the steel stranded rope 411, the locking buckle 414 may be deformed by an external force, and thereby wrapping and locking an end of the steel stranded rope 411 to prevent the steel stranded rope 411 from moving.

In the process of installing the penetrating telescopic rod 412 and the pressure telescopic rod 421, they may be installed in a manner described above or the rods may be installed by rotating 180 degrees in the manner described above. An installation manner of rotating 180 degrees may enable bottoms of the penetrating telescopic rod 412 and the pressure telescopic rod 421 to be fixed directly to the pipe end of the branch pipe 32, and then, through the penetrating telescopic rod 412 and the pressure telescopic rod 421, the position of the positioning sleeve 405 may be determined, and ultimately the other end of the penetrating telescopic rod 412 and the pressure telescopic rod 421 may be secured to the reaction frame 20 to complete the test.

Also, when installing the load sensor 404 (e.g., the second load sensor and the first load sensor), a small cylindrical projection at a front end of the penetrating telescopic rod 412 and the pressure telescopic rod 421 may allow the front end of the penetrating telescopic rod 412 and the pressure telescopic rod 421 to form an axial shoulder structure. When fixing the load sensor 404, the load sensor 404 may be directly socketed onto the shoulder structure, and then the load sensor 404 may be pressed against the positioning plate 406 or the head plate 402. The shoulder structure may be capable of effectively positioning the load sensor 404, preventing the load sensor from moving 404 during the test, and accurately detecting a force on each branch pipe 32.

When an extension angle of the branch pipe 32 is more appropriate, a telescopic rod may be installed using the positioning sleeve 405 and the positioning plate 406. But when the axis of the branch pipe 32 passes through an intersection on a top surface of the reaction frame 20, it is not suitable to use the positioning sleeve 405, and at this time, the positioning plate 406 may be welded directly on the outside or inside of the intersection to install the telescopic rod.

The raft foundation 10, the reaction frame 20, the tree-shaped spatial node 30, and the force measurement assembly 40 may be sequentially assembled and connected together by the above-described structural composition, and then each tension assembly 41 or pressure assembly 42 may be driven to apply a force to each branch pipe 32 in a set manner.

In some embodiments, the auxiliary positioning frame 24 can eliminate the effect of a combined force on the main pipe 31 along a horizontal direction. When the combined force subjected by the main pipe 31 along a plumb direction is pressure along a plumb downward direction, when gravity is ignored, and at that point, four columns 22 of the reaction frame 20 are subjected to a tension force downwardly along the plumb direction. This may achieve a force balance for a whole structure made of the reaction frame 20, the force measurement assembly 40, and the tree-shaped spatial node 30. When the combined force subjected by the main pipe 31 along the plumb direction is tension along a plumb upward direction, when the effect of gravity is ignored, the four columns 22 of the reaction frame 20 are subjected to a thrust upwardly along the plumb direction. This may realize a force balance for the whole structure made of the reaction frame 20, the force measurement assembly 40, and the tree-shaped spatial node 30.

Some embodiments of the present disclosure also use a general-purpose finite element software ABAQUS to perform a finite element analysis of a force performance of a cast steel node of a sports stadium project under a test load, and utilize a reaction frame device provided in some embodiments of the present disclosure to perform a load test for verification.

A concrete plane of the stadium is elliptical, with a length of about 236 m along a north-south direction and a width of about 209 m along an east-west direction. The upper canopy of the stadium adopts a steel truss structure system, and the steel roof adopts a metal roof. An upper canopy of the stadium adopts a steel truss structure system, and a steel roof adopts a metal roof. An upper steel structure is supported by a lower concrete structure with inner and outer ring supports, and a bottom node support column is a steel bone concrete column. This results in a convergence of node rods at supports, with 5 rods converging at an outer ring support and 6 rods converging at an inner ring support. The design needs to follow the "strong nodes, weak components" principle, give full play to the strength of the rod material, the node does not precede the destruction of components, and nodes need to be analyzed for stress.

Figure 12:
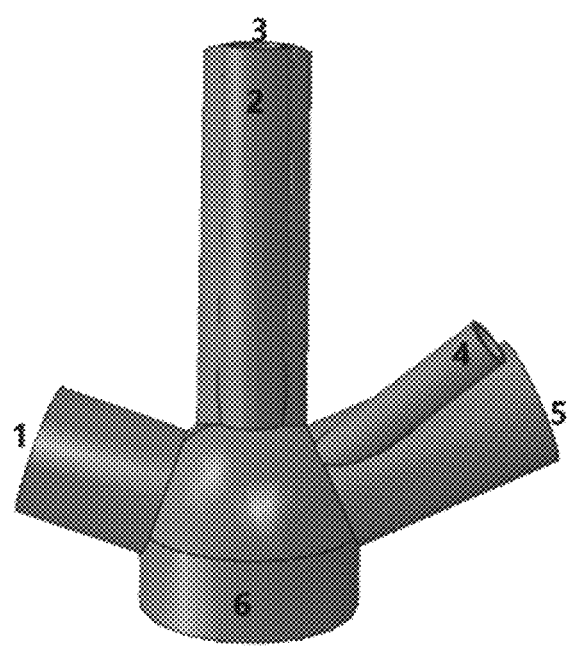
FIG. 12 is a diagram illustrating a 1:2 scaled model of a cast steel node according to some embodiments of the present disclosure.
Figure 13:
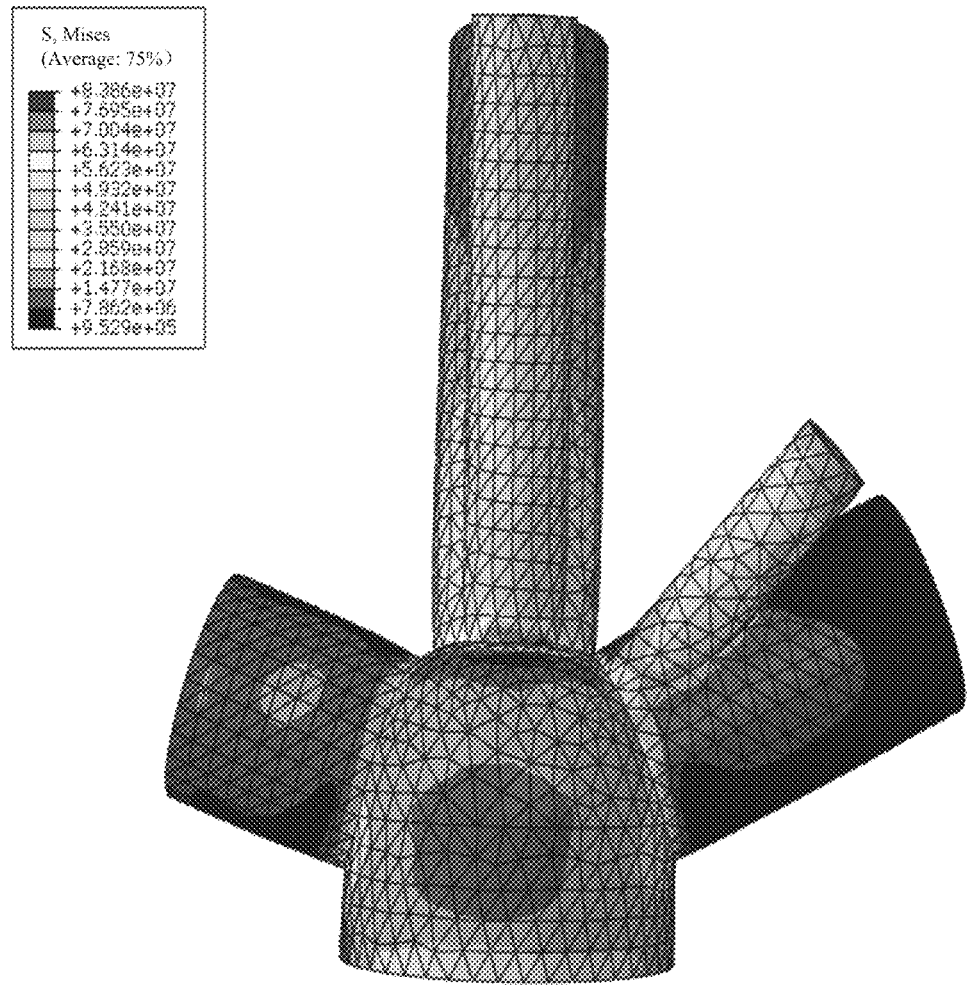
FIG. 13 is a mesh delineation diagram for a loading test of the 1:2 scaled model of the cast steel node according to some embodiments of the present disclosure.

FIG. 12 is a schematic diagram illustrating an exemplary 1:2 scaled model of a cast steel node according to some embodiments of the present disclosure; and FIG. 13 is a mesh delineation diagram for a loading test of a 1:2 scaled model of a cast steel node according to some embodiments of the present disclosure.

As shown in FIG. 12 and FIG. 13, a representative tree-shaped spatial node 30 structure is selected for force analysis: a diameter of the main pipe 31 is 800 mm with a wall thickness of 50 mm, and there is no stiffener rib inside, and a cross-section of the main pipe 31 is 6. A cross-sectional dimension (diameter×wall thickness) of each branch pipe 32 is: a cross-section 1 (480×40), a cross-section 2 (245×25), a cross-section 3 (402×40), a cross-section 4 (180×20) and a cross-section 5 (480×40).

I. Finite Element Simulation:

A material of the tree-shaped spatial node 30 is referred to a set standard, and its mechanical property indexes are yield strength of 230 MPa, ultimate strength of 450 MPa, and elongation of 22%. According to data provided by a manufacturer of cast steel, the material's modulus of elasticity is $2.06 \times 10^5$ MPa, Poisson's ratio is 0.3, and the yield strength is 230 MPa.

Reference points are established at a position of a centroid of each branch pipe 32 and coupling constraints with each cross-section are established. The boundary is based on the actual engineering situation, and a bottom of the cross-section of the tree-shaped spatial node 30 is used as a fixed constraint. Other pipe ends are used as rigid regions, and a local coordinate system is established at a centroid of the rigid region and a concentrated load is applied.

Since a bending moment shear is much smaller than an axial force, a force situation is simplified and the effect of bending moment and shear forces on the nodes is ignored. The system of units used in the analysis is the International System of Units (SI), with the unit of force: N, unit of length: m, and unit of stress in Pa. The tree-shaped spatial node 30 loads are mainly based on the overall structural calculation of the various working conditions, from which the most unfavorable working conditions of the internal force of the rod are selected and obtained. Loads at each node are derived as shown in table 1 below:

TABLE 1

Axial force (kN) at tree-shaped spatial nodes at a most unfavorable working condition

| Loading surface | 1 | 2 | 3 | 4 | 5 |
|---|---|---|---|---|---|
| Working condition I | 364.68 | 675.56 | 608.58 | 138.87 | 255.92 |
| Working condition II | −581.2 | −831.4 | −618.7 | −225.5 | −306.5 |

A VONMISES stress distribution of the tree-shaped spatial node 30 under a most unfavorable load in Table 1 is obtained, and the stress distribution of the node has following patterns:

(1) Portions with a large stress are concentrated on a branch pipe No. 2 with a large load at a rod end, and a stress magnitude is around 50 MPa, while stress values of rod ends of the rest of the branches are relatively small, and a stress magnitude is around 20 MPa.

(2) The maximum stress value of the node is 83.8 MPa, which occurs at the intersection between the branch pipe No. 2 and the ball node. The peak stress does not exceed the yield strength of the material, and stresses in all regions of the node are within the elastic range, and stresses of most of the regions of the node are within 100 MPa, and it can be deduced that the node is subjected to a load much smaller than its bearing capacity.

In order to make the test loading tonnage and member size as close as possible to the limit loading capacity of the designed loading device and to meet the test accuracy and other requirements, it was decided to use a 1:2 scaled-down ratio for the test.

Under the condition of 1:2 scaling ratio, the similarity ratio of internal force is 1:4, and the corresponding internal force after scaling is shown in Table 2 below. At the same time, the safe surplus of bearing capacity after exceeding the design load should be considered, and a space for the later loading needs to be reserved, so the similarity ratio of 1:2 size is chosen.

TABLE 2

Axial forces (kN) of the tree-shaped spatial nodes after 1:2 scaling-down at a most unfavorable working condition

| | Loading surface | | | | | |
|---|---|---|---|---|---|---|
| | 1 | 2 | 3 | 4 | 5 | 6 |
| Working condition I | −87.6 | −187.7 | −156.5 | −378.1 | −337.2 | −347.4 |
| Working condition II | −40.6 | −151.9 | −63.5 | −621.7 | −507.4 | −451.7 |

A VONMISES stress distribution of the tree-shaped spatial node 30 under a most unfavorable load in Table 2 is obtained, it can be seen that:

(1) Portions with a large stress are concentrated on the branch pipe No. 2 with a large load at a rod end, and the stress magnitude is around 50 MPa, while the rest of the rod ends have relatively small stress values, and the stress magnitude is around 20 MPa.

(2) A maximum stress value of 138 MPa at the node occurs at a base. Since a partial of stresses concentrates due to the scaling down, the peak stress does not exceed the yield strength of the material, the stress in all areas of the node is within the elastic range, and most of the areas of the node are within 100 MPa, and it can be inferred that the node is subjected to a load much smaller than its bearing capacity.

II. Loading Test Verification:

The 1:2 scaled model is placed in this reaction frame device, a pressure test member is connected to a tension test member according to a force corresponding to the tree-shaped spatial node 30, and each connected node with the test load as shown in Table 3 and Table 4 below (tension is positive, pressure is negative).

TABLE 3

Axial forces (kN) of the nodes after 1:2 scaling down under a most unfavorable working condition

| Loading surface | 1 | 2 | 3 | 4 | 5 |
|---|---|---|---|---|---|
| Working condition I | −145.3 | −207.8 | −154.7 | −56.4 | −76.6 |
| Working condition II | 91.2 | 168.9 | 152.2 | 34.7 | 63.9 |

TABLE 4

1.3 times the axial force (kN) of the nodes after 1:2 scaling down under a most unfavorable condition

| Loading surface | 1 | 2 | 3 | 4 | 5 |
|---|---|---|---|---|---|
| Working condition I | −188.89 | −270.14 | −201.11 | −73.32 | −99.58 |
| Working condition II | 118.56 | 219.57 | 197.86 | 45.11 | 83.07 |

The test adopts graded loading with a total of 10 levels for loading, before reaching the design load, the loading amount of each level is 15% of the design load, loaded from 0 to 1.3 times the design load, please refer to Table 5. A loading sequence is as follows:

1. Pre-loading: 50% of the design load is applied, loaded in three stages, and then unloaded for checking and testing the connection and working status of each related equipment in preparation for formal loading.
2. Formal loading stage: the load step is taken as 15% of the design load, and load is performed step by step until 90% of the design load, then the load step is adjusted to 10% to load step by step to 130% of the design load. After applying each level of load, pausing for 3 minutes, the data is read after the various responses are stabilized, and then it is continued to apply the next level of load.
3. Uninstallation stage: the entire uninstallation condition is also divided into 10 levels to mainly observe the change of data, and after the uninstallation is completed finally, carefully compare whether the strain after the uninstallation is recovered.

TABLE 5

Loading regime table of working conditions at nodes (unit: kN)

| Load Rating | Design load times | Branch pipe 1 | Branch pipe 2 | Branch pipe 3 | Branch pipe 4 | Branch pipe 5 |
|---|---|---|---|---|---|---|
| 1 | 15% | 13.68 | 25.335 | 22.83 | 5.205 | 9.585 |
| 2 | 30% | 27.36 | 50.67 | 45.66 | 10.41 | 19.17 |
| 3 | 45% | 41.04 | 76.005 | 68.49 | 15.615 | 28.755 |
| 4 | 60% | 54.72 | 101.34 | 91.32 | 20.82 | 38.34 |
| 5 | 75% | 68.4 | 126.675 | 114.15 | 26.025 | 47.925 |
| 6 | 90% | 82.08 | 152.01 | 136.98 | 31.23 | 57.51 |
| 7 | 100% | 91.2 | 168.9 | 152.2 | 34.7 | 63.9 |
| 8 | 110% | 100.32 | 185.79 | 167.42 | 38.17 | 70.29 |
| 9 | 120% | 109.44 | 202.68 | 182.64 | 41.64 | 76.68 |
| 10 | 130% | 118.56 | 219.57 | 197.86 | 45.11 | 83.07 |

In view of the fact that each branch pipe 32 is only axially stressed and the form of stress is simple, it is contemplated that a unidirectional strain gauge along the axial direction of the branch pipe 32 is arranged at the rod end of the tree-shaped spatial node 30. And a node region, i.e., an intersection region of the branch pipe 32 and the branch pipe 32, due to the complexity of the force thereof, it is not possible to determine the direction of the principal stress of the coherent accessory branch pipe 32, and for this reason, a 45° three-way strain gauge is arranged in the coherent accessory of the branch pipe 32 in order to examine the stress distribution here.

Based on the strain and the hydraulic jack loading indications obtained by the load sensor and a strain collector, the stress at the corresponding position of the tree-shaped spatial node 30 and the end load value of the branch pipe 32 may be calculated, respectively. The strain at a corresponding position of the unidirectional strain gage may be calculated using a following formula:

$$\sigma = E\varepsilon;$$

Where, σ denotes stress, E denotes elastic modulus, and $\iota$ denotes Poisson's ratio.

The stress at a symmetric position may be calculated using a following formula:

$$\sigma_s = \sqrt{\frac{\sigma_1^2 + \sigma_3^2 + (\sigma_1 + \sigma_2)^2}{2}};$$

Where, σs denotes the stress at the symmetric position, σ1 denotes stress of a branch pipe No. 1; σ2 denotes stress of a branch pipe No. 2; σ3 denotes stress of a branch pipe No. 3; and a strain value at the symmetric position of the same branch pipe 32 are averaged, where the elastic modulus E is taken from the material test results, and the Poisson's ratio ε is taken as 0.3. Tree-shaped spatial node 30 in the No. 2 branch pipe and the No. 3 branch pipe is relatively large, so the results of the corresponding strain curve of the measurement point are given, as well as the corresponding working conditions of the larger force of the rod cast steel section strain and strain conversion stress comparison.

From the results of the experimental test, it can be seen that, except for some branch pipes, each branch pipe basically changes linearly during the loading process. This indicates that when loaded according to 1.3 times the design load, the tree-shaped spatial node 30 has been in the state of elastic deformation, and has not reached the yield stress. The change rule of the strain of the tree-shaped spatial node 30 under the two working conditions is basically the same, indicating that there is little difference in the tension and pressure mechanical properties of the cast steel specimens. During the loading process of the whole tree-shaped spatial node 30, a strain of the No. 2 branch pipe in the branch pipe is the largest, reached 269με, its stress is about 56 MPa; a local stress occurred at an intersection between the main pipe 31 of the No. 2 branch pipe and the No. 6 branch pipe is the largest, reaching 104 MPa, which is lower than the yield stress of steel 365 MPa, with a margin of 2.5, indicating that the specimen is reasonably designed. The position is the chamfered area where the No. 2 branch pipe 32 meets a No. 6 main pipe 31 of the tree-shaped spatial node 30. On one hand, the second branch pipe 32 is the component under the greatest stress. On the other hand, this area is where the branch pipes converge, resulting in a complex stress state and a tendency for stress concentration. In both conditions, the measurement points for ZG2-5 and ZG3-5 are in the middle area of branch pipe 32, and compared to the other four points located at the ends of branch pipe 32, strain values thereof are smaller. This may be because stress concentration occurs at the pipe ends, and as stress is transferred to the middle area of branch pipe 32, the strain approaches the true strain value under the current conditions, resulting in smaller values.

The results of the finite element analysis show that the tree-shaped spatial node 30 is designed to have high safety redundancy, but in view of the error between the modeling and the actual significance, it is tested to prove the performance of the tree-shaped spatial node 30. The test results show that the tension and pressure mechanical properties of the tree-shaped space node 30 are similar to the results of the finite element simulation, with an error of 10% or less, and the results can be mutually verified.

The foregoing tests demonstrate that the reaction frame device provided by some embodiments of the present disclosure is capable of being used for testing of tree-shaped spatial nodes in existing engineering. This reaction frame device has a simple structure, is easy to use, and can partially replace finite element simulation work, which greatly simplifies the process of testing of tree-shaped spatial nodes in existing engineering, and provides test results consistent with the theoretical simulation as reliable references for engineering.

In some embodiments, a reaction frame device may further include a control system (not shown in the figures), and the control system may be configured to control each tension assembly 41 or each pressure assembly 42 to apply force to each branch pipe based on a preset loading test. In some embodiments, the control system may be further configured to control both the tension assembly 41 and the pressure assembly 42 to apply force to each branch pipe 32 simultaneously based on a preset loading test.

The control system may be a system used to control other parts or components of the reaction frame device. In some embodiments, the control system may be used to control the force measurement assembly 40 (e.g., the tension assembly 41 and the pressure assembly 42).

In some embodiments, the force measurement assembly 40 may include an electric jack, i.e., the penetrating telescopic rod 412 of the tension assembly 41 and the pressure telescopic rod 421 of the pressure assembly 42 both employ electric jacks. The control system may be communicatively connected to a drive module of the electric jack and control the force measurement assembly 40 in real-time based on a preset loading test. Exemplary communication connections may include Bluetooth, WIFI, fiber optics, etc.

The preset loading test refers to a preset loading test verification manner. For more information on loading test verification, please refer to the previous description.

In some embodiments, the reaction frame device may further include a processor (not shown in the figures), the processor being configured to determine whether to generate inspection strategy information based on strain data, load data, and control data during a preload test.

The processor may process data and/or information obtained from other devices or systems. The processor may execute program instructions based on such data, information, and/or processing structures to perform one or more of the functions described in the present disclosure. In some embodiments, the processor may include one or more sub-processing devices (e.g., a single-core processing device or a multi-core processing device). By way of example only, the processor may include a central processing unit (CPU), a controller, a microprocessor, etc., or any combination of the above.

The preset loading test may be a testing phase before a formal loading test. For more information on the preset loading, please refer to the previous description.

The strain data refers to deformation data of a strain gauge (e.g., a unidirectional strain gauge, etc.). In some embodiments, the strain data may be used to characterize stress at a corresponding position of the strain gauge.

In some embodiments, the processor may be communicatively connected to the strain gauge to obtain the strain data through the strain gauge.

The load data may be relevant data measured by a load sensor (e.g., the first load sensor, etc.). In some embodiments, the load data may include at least one of first load data or second load data. In some embodiments, the load data may be used to characterize force applied axially to the branch pipe 32.

In some embodiments, the processor may be communicatively coupled to the load sensor to obtain the load data via the load sensor.

The control data is data related to the control system used to control the force measurement assembly 40. For example, the control data may include a distance moved by the tension assembly 41 and/or the pressure assembly 42 (e.g., a distance by which the penetrating telescopic rod 412 of the tension assembly 41 and/or the pressure telescopic rod 421 of the pressure assembly 42 is extended or shortened), a movement speed, or the like.

In some embodiments, the processor may also be communicatively coupled to the control system to obtain the control data directly from the control system.

The inspection strategy information refers to strategy information related to alerting a technician to inspect issues such as device connectivity or device installation. For example, the inspection strategy information may include the need to re-inspect the installation of the load sensor, etc.

In some embodiments, the processor may determine whether or not to generate the inspection strategy information based on the strain data, the load data, and the control data during a preloading test by determining whether the strain data, the load data, and the control data satisfy a preset condition.

As an example only, when any one of the strain data, the load data, and the control data does not satisfy the preset condition, a corresponding inspection strategy information is generated. The preset condition may be that a difference between the strain data and a preset strain threshold exceeds a strain change range, a difference between the load data and a preset load threshold exceeds a load change range, and a difference between the control data and a preset control threshold exceeds a control change range, and so on. In some embodiments, the preset strain threshold, the strain change range, the preset load threshold, the load change range, and the preset control threshold, and the control change range may be set in advance by a skilled person.

In some embodiments, the processor may, in response to determining the load data satisfying a first preset condition, determine the load sensor as an object to be inspected and generate the inspection strategy information. The inspection strategy information includes that the installation of the load sensor needs to be reinspected.

In some embodiments, the first preset condition may include that a difference between the load data and a reference load data is negative and the load data exceeds a preset range.

The reference load data may be a theoretical value of the load data. In some embodiments, the reference load data may be determined based on a preset comparison table. The preset comparison table may be used to characterize a correlation between the control data and the reference load data, and each control data may have a corresponding reference load data. In some embodiments, the preset comparison table may be constructed based on test data from a historical loading test and an evaluation of the historical loading test by a technician. The evaluation of the historical loading test by the technician may reflect a good result or a bad result of the historical loading test. For example, the more the result of the historical loading test converges to a force situation simulated by a finite element software, the higher the score of the loading test.

In some embodiments, the technician may determine actual load data of a historical loading test with a highest score as the reference load data.

The preset range may be a preset data range that the load data should be in. For example, the preset range may be [0.9×reference load data, 1.05×reference load data], etc.

In some embodiments, the preset range correlates to a distance between two parallel axes. For example, the further the distance between the two parallel axes, the lower the limit of the preset range and the higher the preset range.

The two parallel axes may include a center axis of the positioning plate 406, and an axis of the penetrating telescopic rod 412 or the pressure telescopic rod 421 that coincides with the axis of the branch pipe 32. In some embodiments, the distance between the two parallel axes may be actually measured by a skilled person.

More information on the parallel axes can be found in the relevant descriptions later (e.g. FIG. 14).

Understandably, if the distance between the two parallel axes is 0 (i.e., the center axis of the positioning plate 406, the axis of the penetrating telescopic rod 412 or the pressure telescopic rod 421 that coincides with the axis of the branch pipe 32), a force is transferred best at this point and test data obtained is more accurate. On the contrary, if the distance between the two parallel axes is larger, the more inaccurate test data is obtained, so the limit of the preset range may be lower and the preset range may be larger.

The object to be inspected is an object waiting to be inspected. In some embodiments, when the load data satisfies the first preset condition, the processor may directly identify the load sensor as the object to be inspected, and automatically generate the inspection strategy information via code to facilitate reminding the technician to inspect the installation of the load sensor.

In some embodiments, the processor may also, in response to determining that the load data satisfies a second preset condition, determine the force measurement assembly 40 and the control system as objects to be inspected and generate the inspection strategy information. The inspection strategy information may include there is a need to re-inspect the tension assembly 41 and/or the tension assembly 42, and a need to re-inspect the control system.

In some embodiments, the second preset condition may include that the difference between the load data and the reference load data is positive and the load data exceeds the preset range.

Understandably, if the force measurement assembly 40 (e.g., the tension assembly 41) is moved by a distance, but actually-detected load data is much greater than the reference load data, there may be a malfunction in the force measurement assembly 40, or a malfunction in the control system. Therefore, it is necessary to recheck the force measurement assembly 40 and the control system.

In some embodiments, when the load data satisfies the second preset condition, the processor may determine the force measurement assembly 40 and the control system as objects to be inspected, and automatically generate the inspection strategy information via code to facilitate reminding the technician to inspect the tension assembly 41 and/or pressure assembly 41, and the control system.

Some embodiments of the present disclosure, by automatically analyzing test result data of the preset loading test at a preloading test stage and giving an analysis result and inspection advice, the technician can re-inspect a connection or a working state of a device, etc., thus helping to ensure the completion of a subsequent formal loading test and the accuracy of test data.

In some embodiments, the control system may control the force measurement assembly 40 to stop applying force in response to determining the load data satisfies the second preset condition.

In some embodiments, when the load data satisfies the second preset condition, the control system may automatically generate a stop force application command via code and send the stop force application command to the force measurement assembly 40 to control the force measurement assembly 40 to stop applying force.

When the load data satisfies the second preset condition (i.e., the load data is much larger than the reference load data), a design load may be too large, and at this time, by controlling the force measurement assembly 40 to stop applying force through the control system, the damage caused by the design load being too large may be effectively avoided.

In some embodiments, the processor may be further configured to generate the inspection strategy information in response to a stress uniformity of any one of the branch pipes 32 exceeding a first preset threshold after the control system has controlled the force measurement assembly 40 to apply force simultaneously. The inspection strategy information may include adjusting the axis of the penetrating telescopic rod 412 or the pressure telescopic rod 421 that coincides with the axis of the branch pipe 32 through an axis adjustment device.

The stress uniformity may reflect a degree of uniformity of stress on the same branch pipe 32. In some embodiments, the stress uniformity may be a ratio of a stress difference to a maximum value of stress at a symmetrical position of the branch pipe 32 for a same branch pipe 32.

In some embodiments, the stress uniformity may be calculated. In some embodiments, the technician may number or code the branch pipe 32 and a unidirectional strain gauge disposed on the branch pipe 32 to facilitate determining a corresponding stress uniformity of each branch pipe 32.

For example, unidirectional strain gauges symmetrically disposed on the branch pipe 1 may be noted as a unidirectional strain gauge A1 and a unidirectional strain gauge A2, and a strain at a position corresponding to the unidirectional strain gauge A1 may be $\sigma_1$ and a strain at a position corresponding to the unidirectional strain gauge A2 may be $\sigma_2$. If $\sigma_1 > \sigma_2$, then the strain uniformity of this branch pipe $1 = |\sigma_1 - \sigma_2|/\sigma_1$.

For more details on a calculation manner of stress $\sigma$ at a corresponding position of the unidirectional strain gauge, please refer to the previous description.

In some embodiments, when the control system controls the force measurement assembly 40 to apply force simultaneously and a stress uniformity of any one of the branch pipes 32 exceeds the first preset threshold, the processor may automatically generate the inspection strategy information via codes to alert the technician to adjust the axis of the penetrating telescopic rod 412 or the pressure telescopic rod 421 that coincides with the axis of the branch pipe 32 via the axis adjustment device. In some embodiments, the first preset threshold may be set in advance by a technician based on prior experience.

Figure 14:
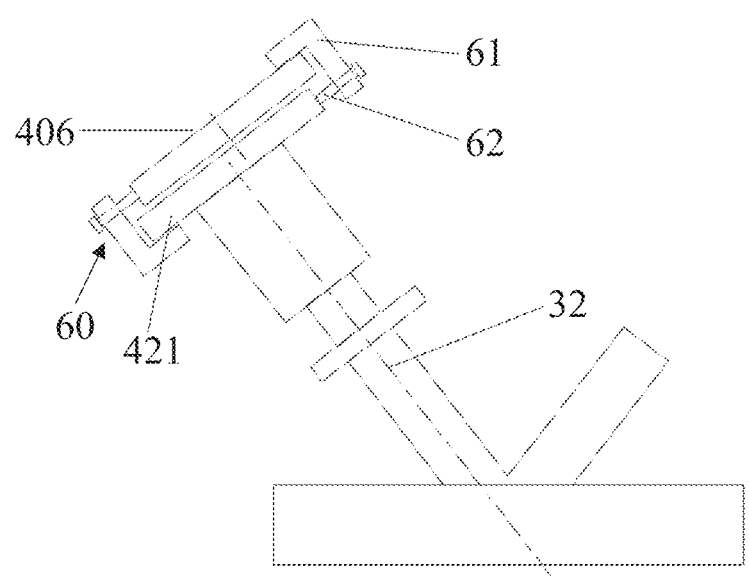
FIG. 14 is a schematic diagram illustrating an exemplary structure of an axis adjustment device according to some embodiments of the present disclosure.

More information on the axial adjustment device can be found in the relevant description later (FIG. 14).

In some embodiments of the present disclosure, by analyzing the stress uniformity on each of the branch pipe 32 and generating the inspection strategy information when the stress uniformity of a certain branch pipe 32 exceeds the first preset threshold, a technician may be reminded to adjust the axis of the penetrating telescopic rod 412 or the pressure telescopic rod 421 that coincides with the axis of the branch pipe 32 via the axis adjustment device, so as to make the axis parallel or even overlap with a center axis of the positioning plate 406, thereby facilitating the transfer of force and ensuring the accuracy of the test data.

In some embodiments, the processor may be further configured to generate the inspection strategy information in response to determining a stress increase uniformity of the branch pipe 32 exceeds a second preset threshold after the control system has controlled the force measurement assembly 40 to apply force simultaneously; and, based on the stress increase uniformity and the strain data, determine a target distance between the two parallel axes. The inspection strategy information may include adjusting the axis of the penetrating telescopic rod 412 or the pressure telescopic rod 421 that coincides with the axis of the branch pipe 32 via the axis adjustment device.

The stress increase uniformity may be used to characterize how well a magnitude of stress increase of each branch pipe 32 matches a corresponding design load increase magnitude during the simultaneous application of force. More information on the design load can be found in the preceding description.

In some embodiments, the processor may obtain the stress increase uniformity of the branch pipe 32 by calculating an average of differences between strain data and theoretical strain data of each branch pipe 32.

As an example only, the processor may calculate theoretical strain data of each branch pipe 32 based on the load data and a cross-sectional area of each branch pipe using a theoretical stress calculation formula; and calculate an average of differences between strain data and theoretical strain data of each branch pipe 32 using an average calculation formula, i.e., the stress increase uniformity of the branch pipe 32 is obtained.

An exemplary theoretical stress calculation formula may include $\sigma'_1 = F_1/A_1$, where, $\sigma'_1$ denotes theoretical strain data of a branch pipe 1; $F_1$ denotes load data of the branch pipe 1; and $A_1$ denotes a cross-sectional area of the branch pipe 1. The cross-sectional area of the branch pipe refers to an area of a cross-section of the branch pipe that is plumbed to an axial direction of the branch pipe. In some embodiments, the cross-sectional area of the branch pipe may be obtained by input from the technician, and the load data may be obtained based on the load sensor.

An exemplary average calculation formula may include:

$$\bar{\sigma} = \frac{(|\sigma_1 - \sigma'_1| + |\sigma_2 - \sigma'_2| + \ldots + |\sigma_n - \sigma'_n|)}{n},$$

where, $\bar{\sigma}$ denotes a strain increase uniformity of the branch pipe 32; and $|\sigma_n - \sigma'_n|$ denotes a difference between strain data and theoretical strain data of an n-th branch pipe 32.

In some embodiments, when the stress increase uniformity of the branch pipe 32 exceeds the second preset threshold after the control system has controlled the force measurement assembly 40 to apply force simultaneously, the processor may automatically generate the inspection strategy information via codes to alert the technician to adjust the axis of the penetrating telescopic rod 412 or the pressure telescopic rod 421 that coincides with the axis of the branch pipe 32 via the axis adjustment device. In some embodiments, the second preset threshold may be set in advance by the technician.

Understandably, even though design loads applied to different branch pipes 32 are different, a stress on each branch pipe 32 should increase linearly after the force is applied simultaneously since each branch pipe 32 is only subjected to a force axially. That is to say, an increase of a on a design load applied to a particular branch pipe 32 should theoretically result in an increase of b in a stress on that branch pipe 32. If an actual stress increase is less than the theoretical stress increase b, it may indicate that the axis of the penetrating telescopic rod 412 or the pressure telescopic rod 421 that coincides with the axis of the branch pipe 32 is not parallel to or coincides with the center axis of the positioning plate 406 (i.e., the axis of the penetrating telescopic rod 412 or the pressure telescopic rod 421 that coincides with the axis of the branch pipe 32 is tilted), such that the force along the axial direction of the branch pipe is partially broken up along other directions.

Based on this, by comparing whether or not the stress increase uniformity of the branch pipe 32 exceeds the second preset threshold, it is equivalent to analyzing an overall stress situation of a plurality of branch pipes 32 and determining whether an axis of any of the branch pipe 32 in the plurality of branch pipes 32 is tilted relative to the axis of the penetrating telescopic rod 412 or the pressure telescopic rod 421. Such analysis manner is closer to the actual situation, which may make the subsequent adjustment of the axis more reliable.

The target distance may be a straight line distance that should be satisfied between the center axis of the positioning plate 406 and the axis of the penetrating telescopic rod 412 or the pressure telescopic rod 421 that coincides with the axis of the branch pipe 32 in a parallel state.

In some embodiments, the processor may, based on the stress increase uniformity and the strain data, determine a branch pipe 32 corresponding to a maximum value of a difference between the strain data and the theoretical strain data when the stress increase uniformity exceeds the second preset threshold as an object to be adjusted. The processor may then determine the target distance by calculating a straight line distance between an axis of the object to be adjusted and the center axis of the positioning plate 406. The object to be adjusted may be a branch pipe 32 whose axis needs to be adjusted to be parallel with the center axis of the positioning plate 406. Exemplary distance calculation manners may include a translation manner, a vector manner, an iso-volume manner, a constructor manner, or the like.

In some embodiments, the processor may be further configured to generate a drive command based on the target distance between the two parallel axes and send the drive command to a drive component of a motorized axis adjustment device, so that the motorized axis adjustment device may adjust the object to be adjusted based on the target distance between the two parallel axes.

In some embodiments, the processor may be communicatively coupled to the motorized axis adjustment device, such as the drive component. For more information on the motorized axis adjustment device, please refer to FIG. 14 and its related description.

In some embodiments, the processor may automatically generate the drive command via codes and send the drive command to the drive component of the motorized axis adjustment device based on the target distance between the two parallel axes. The drive command may be a command related to driving the motorized axis adjustment device to adjust the object to be adjusted based on the target distance between the two parallel axes.

In some embodiments, when the drive component of the motorized axis adjustment device receives the drive command, the drive component may immediately control the motorized axis adjustment device to adjust the object to be adjusted based on the target distance between the two parallel axes until a straight line distance between an axis of the object to be adjusted and the center axis of the positioning plate 406 is the target distance (i.e., the axis of the object to be adjusted and the center axis of the positioning plate 406 are parallel), and the adjustment is stopped.

In some embodiments of the present disclosure, the object to be adjusted may be automatically adjusted by the motorized axis adjustment device based on the target distance between the two parallel axes, which may conveniently and quickly make the axis of the object to be adjusted parallel to the center axis of the positioning plate 406, thereby improving the accuracy of the test data.

FIG. 14 is a schematic diagram illustrating an exemplary structure of an axis adjustment device according to some embodiments of the present disclosure. As shown in FIG. 14, a reaction frame device may further include an axis adjustment device 60, the axis adjustment device 60 including two L-type plates 61 and two adjustment bolts 62.

The axis adjustment device 60 refers to a device for adjusting a position of the branch pipe 32 so that an axis of the branch pipe 32 is parallel or even coincides with a center axis of the positioning plate 406.

FIG. 14 shows the axial adjustment device 60 in connection with the pressure assembly 42. As shown in FIG. 14, the two L-type plates 61 and two adjustment bolts 62 may be rotationally and symmetrically provided on two sides of fixation ends of the positioning plate 406 and the pressure telescopic rod 421. Inner sides of the two L-type plates 61 may be affixed to end surfaces of the fixation ends of the positioning plate 406 and the pressure telescopic rod 421, respectively, for snapping the fixation ends of the positioning plate 406 and the pressure telescopic rod 421 between the two L-type plates 61. The two adjustment bolts 62 each pass through one of the L-type plates 61 and are connected to a side end of the positioning plate 406 and a side end of the fixation end of the pressure telescopic rod 421, respectively.

In some embodiments, a position of a center axis of the positioning plate 406 relative to an axis of the pressure telescopic rod 421 may be adjusted by adjusting a tightening depth of the adjustment bolt 62. Furthermore, since the pressure telescopic rod 421 and the branch pipe 32 are coaxially provided, by adjusting the tightening depth of the adjustment bolt 62, it may be possible to achieve such that the center axis of the positioning plate 406 and an axis of the pressure telescopic rod 421 that coincides with an axis of the branch pipe 32 are parallel or even coincide.

In some embodiments, the axis adjustment device 60 may be set up slightly differently between the tension assembly 41 and the branch pipe 32 since the tension assembly 41 and the branch pipe 32 are connected in a different manner than the pressure assembly 42 and the branch pipe 32. Specifically, since holes are provided at positions through which the steel stranded rope 411 passes, a diameter of a hole on the positioning plate 406 may be larger than a diameter of the steel stranded rope 411 to provide the axial adjustment device 60 between the positioning plate 406 and the connection base 403.

It should be noted that the axis adjustment device 60 may also take any other feasible structural form that is capable of making the center axis of the positioning plate 406 and the axis of the pressure telescopic rod 421 that coincides with the axis of the branch pipe 32 parallel or even coincide.

Understandably, when the center axis of the positioning plate 406 and the axis of the pressure telescopic rod 421 or the penetrating telescopic rod 412 that coincides with the axis of the branch pipe 32 coincide, force may be transferred optimally, and the subsequently obtained test data may be more accurate. However, due to other factors such as manufacturing errors, calculation errors, or the like, after installation, the center axis of the positioning plate 406 and the axis of the pressure telescopic rod 421 or the penetrating telescopic rod 412 that coincides with the axis of the branch pipe 32 may be misaligned and may not coincide or be parallel. Therefore, by providing the axis adjustment device 60, the center axis of the positioning plate 406 and the axis of the pressure telescopic rod 421 or the penetrating telescopic rod 412 that coincides with the axis of the branch pipe 32 may be made parallel or even overlapped as much as possible, which is conducive to improving the force transfer effect, and thus improving the accuracy and reliability of the test data.

In some embodiments, the axis adjustment device 60 may be a motorized axis adjustment device that includes at least a drive component and is communicatively coupled to a processor.

The motorized axis adjustment device may be an axis adjustment device 60 capable of being controlled electrically. The drive component may be a component that drives an operation of the motorized axis adjustment device. Exemplary drive components may include a servo motor, an electric cylinder, or the like.

As an example only, the drive component may be a servo motor, and an output axis of the motor may be connected to the adjustment bolt 62, and the tightening depth of the adjustment bolt 62 may be adjusted by rotating the motor. For example, if the motor is rotated positively, the tightening depth of the adjustment bolt 62 may be increased; if the motor is rotated negatively, the tightening depth of the adjustment bolt 62 may be decreased.

In some embodiments, the drive component may, in response to receiving a drive command sent from the processor, control the motorized axis adjustment device to automatically adjust the branch pipe 32 so that the axis of the branch pipe 32 is parallel to or even coincides with the center axis of the positioning plate 406. For more information on how the motorized axial adjustment device achieves an automatic adjustment, please refer to the related description in the preceding section.

In some embodiments of the present disclosure, through further using the motorized axis adjustment device, an automatic adjustment of an axis is realized, which reduces manual operation and enhances automation in the process of axis adjustment.

Beneficial effects of a test method for measuring a force situation of a tree-shaped spatial node may include, but are not limited to:

1. In some embodiments of the present disclosure, due to a large combined force subjected by a tree-shaped spatial node, using a steel reaction frame and a raft foundation to synergistically subject a force, and a steel reaction frame for a test is designed to be an incompletely self-reaction device, which is capable of effectively reducing an amount of steel used in the reaction frame, and at the same time increase the reliability of the reaction frame in the test process.
2. In some embodiments of the present disclosure, a pulling force that is vertically upward is applied at four column base positions of the reaction frame and at a column base position at a bottom of a main pipe in the tree-shaped spatial node, so the raft foundation is used to replace an anti-drawing pile foundation and a large independent foundation, and a force at each column base is effectively transferred to the raft foundation by utilizing a main beam and a secondary beam, which makes the overall force distribution of the device more reasonable.
3. An anchor hook of a J-type used in some embodiments of the present disclosure, in conjunction with the main beam and the secondary beam, can form a stable stress connection, which in turn ensures the stability of the test process, and at the same time can reduce the use of steel and concrete, reducing the cost of the test.
4. In some embodiments of the present disclosure, a positioning beam is provided at the column base of the tree-shaped spatial node and each column base of the reaction frame, which can solve the displacement phenomenon at the column base at the bottom of the main pipe caused by a relatively large horizontal shear force is generated due to differences between force situations and force directions of each branch pipe during the test.
5. In some embodiments of the present disclosure, by scaling down the tree-shaped spatial node in proportions, a dimension of a test device may be reduced and a loading tonnage of a force may be reduced.
6. The cooperation between a jack, a positioning plate, a head plate, and a positioning sleeve may load two working conditions of pulling and pressing on the tree-shaped spatial node.
7. For different test contents, a bifurcation angle of each branch pipe in the tree-shaped spatial node is different, adjacent columns and crossbeams may present different angles through a ball node to meet the demand of multiple bifurcation angles of the branch pipe to complete the test smoothly.
8. In some embodiments of the present disclosure, constituting the reaction frame using the cooperation between the crossbeam, the column, and the ball node, for different projects with different bifurcation angles for branches, can provide a frame structure that is easy to adjust and suitable for a test. Since the combined force subjected by the main pipe of the tree-shaped spatial node is larger, using the steel reaction frame with the raft foundation to synthetically subject to force can reduce the amount of steel used and increase reliability.
9. Some embodiments of the present disclosure provide the reaction frame device in which a to-be-tested tree-shaped spatial node is placed inside the reaction frame, and a tension assembly or a pressure assembly is arranged on each branch pipe, which can apply force according to a working condition of test pressure or a working condition of test tension based on a loading condition. The working condition of test pressure may be performed using a jack and a load sensor arranged between the reaction frame and the tree-shaped spatial node, and the working condition of the test tension may be performed using a penetrating jack and a steel stranded rope placed outside the reaction frame; and by testing corresponding force application situations in two different ways, the accuracy of force application may be effectively improved. The reaction frame device has a simple structure and is easy to set up, which can greatly simplify the process of testing the tree-shaped spatial node in the existing engineering, and provide a test result in line with the theoretical simulation, which provides a reliable reference for the engineering.
10. The auxiliary positioning frame includes a locking sleeve that may be socketed to the body of the main pipe of a tree-shaped spatial node, four positioning beams are arranged sequentially on an outer wall of the locking sleeve along a circumferential direction of the locking sleeve, and one end of the positioning beam is fixedly coupled with an adjacent intersection on a bottom surface in turn, thus locking the main pipe of the tree-shaped spatial node within the bottom surface, which prevents the main pipe from moving horizontally and eliminating the effect of shear stress on the main pipe.
11. In some embodiments of the present disclosure, by automatically analyzing test result data of a preset loading test during a preset loading test stage and giving an analysis result and inspection advice, a technician can re-inspect and adjust the connection or working condition, etc., of a device based on the inspection advice, thereby contributing to ensuring the completion of the subsequent formal loading test and the accuracy of the test data.
12. In some embodiments of the present disclosure, by setting up an axis adjustment device, a center axis of a positioning plate and an axis of a pressure telescopic rod or a penetrating telescopic rod that coincides with an axis of the branch pipe are parallel or even overlapping as much as possible, which is conducive to increasing the effect of the force transfer, and thus improving the accuracy and reliability of the test data.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

What is claimed is:

1. A test method for measuring a force situation of a tree-shaped spatial node, comprising:
    S1, constructing a raft foundation and arranging an upper face of the raft foundation horizontally, and installing a reaction frame on the raft foundation;
    S2, manufacturing a corresponding tree-shaped spatial node scaled down proportionally according to a specific structure and a force situation of a space steel structure, and calculating a corresponding force situation of each branch pipe in the tree-shaped spatial node according to a result of proportional scaling;

S3, mounting the tree-shaped spatial node on the reaction frame and the raft foundation;

S4, determining a type of a force measurement assembly corresponding to the each branch pipe according to the force situation of the each branch pipe, and installing the determined force measurement assembly at a corresponding position on the reaction frame; and S5, simultaneously activating each force measurement assembly to apply a force to the each branch pipe according to the force situation of the each branch pipe, and adjusting a force value in real-time through a load sensor to restore a force state of the tree-shaped spatial node;

the raft foundation, wherein the reaction frame is fixedly installed on the raft foundation, and a cavity is formed inside the reaction frame to accommodate the tree-shaped spatial node; wherein the tree-shaped spatial node is arranged in the cavity, and a main pipe of the tree-shaped spatial node is plumb-fastened to the raft foundation, the force measurement assembly is arranged in an upper space of the cavity, the force measurement assembly is configured to simultaneously apply a force of a set value to the each branch pipe in the tree-shaped spatial node along an axial direction of the each branch pipe and detect a combined force applied to the tree-shaped spatial node;

the reaction frame includes crossbeams arranged horizontally along a length direction of the crossbeams, each crossbeam of the crossbeams joins end to end to form a loop; at least two sets of columns are arranged sequentially on a lower ring surface of the loop along a circumferential direction of the loop, bottoms of the columns are fixedly connected to the raft foundation, and the columns are constructed to suspend the loop above the raft foundation;

a space below the loop constitutes the cavity for accommodating the tree-shaped spatial node; the reaction frame further includes an auxiliary positioning frame, the auxiliary positioning frame being arranged at a bottom of the cavity and configured to position the tree-shaped spatial node along a horizontal direction; and the auxiliary positioning frame includes a locking sleeve coaxially arranged on the main pipe of the tree-shaped spatial node, an outer side of the locking sleeve is equipped with positioning beams, the positioning beams being arranged sequentially along a circumferential direction of the locking sleeve and a count of the positioning beams being matched with a count of the columns; the positioning beams are horizontally arranged along a length direction of the positioning beams and one end of each of the positioning beams is fixedly connected to a corresponding column.

2. The test method of claim 1, wherein the force measurement assembly includes a pressure assembly and a tension assembly;

the pressure assembly includes a head plate coaxially fixed on a pipe end of the branch pipe and a positioning sleeve coaxially socketed and locked on the crossbeam, a pressure telescopic rod is installed between the positioning sleeve and the head plate, the pressure telescopic rod being coaxially arranged with the branch pipe and configured to apply pressure to the head plate along a horizontal direction; the load sensor is arranged compactly between a telescopic end of the pressure telescopic rod and a disk surface of the head plate, the load sensor being configured to measure pressure exerted by the pressure telescopic rod; and the tension assembly also includes the head plate coaxially fixed on the pipe end of the branch pipe and the positioning sleeve coaxially socketed and locked on the crossbeam; a penetrating telescopic rod is disposed on a side of the positioning sleeve away from the head plate, an axis of the penetrating telescopic rod coincides with an axis of the branch pipe; a tail end of a steel stranded rope is fixed to the head plate, a front end of the steel stranded rope passes through the positioning sleeve and the crossbeam in turn, and passes out of the penetrating telescopic rod through an axial hole of the penetrating telescopic rod; the front end of the steel stranded rope and a position-limiting plate are fixedly connected to each other; a telescopic end of the penetrating telescopic rod is pressed against the position-limiting plate to tension the steel stranded rope along the axis of the branch pipe; and the load sensor is also clamped between the telescopic end of the penetrating telescopic rod and the position-limiting plate, the load sensor being configured to measure pressure exerted by the penetrating telescopic rod.

3. The test method of claim 2, wherein the positioning sleeve is coaxially and slidably arranged on the crossbeam, and at least two sets of positioning screw holes are sequentially provided on an outer surface of the positioning sleeve along an axial direction of the positioning sleeve, and a positioning bolt is tightened inside each of the at least two sets of positioning screw holes, and a front end of the positioning bolt is pressed against the crossbeam to lock the positioning sleeve.

4. The test method of claim 3, wherein the positioning sleeve is equipped with a positioning plate whose surface is parallel to the disk surface of the head plate, the pressure telescopic rod and the penetrating telescopic rod are both plumb-fastened to a corresponding positioning plate.

5. The test method of claim 4, wherein the front end of the steel stranded rope passes through the position-limiting plate and is coaxially socketed inside a locking buckle, the locking buckle constitutes a rope joint structure to avoid the position-limiting plate moving towards the front end of the steel stranded rope.

6. The test method of claim 5, wherein the raft foundation is a reinforced concrete structure including two main beams and one secondary beam, the two main beams being arranged at ends of the secondary beam, respectively, to form a beam-slab structure in conjunction with the secondary beam;

the concrete structure of the raft foundation includes two sets of transversely-placed main beam reinforcement cages, a transversely-placed secondary beam reinforcement cage, and at least two sets of J-type column base anchor bolts;

each of the at least two sets of J-type column base anchor bolts includes at least two J-type anchor hooks; anchor hooks in the same set of the J-type column base anchor bolt are uniformly and sequentially distributed along a set circumferential direction to form a cylindrical reinforcement cage; and a bottom of each of the at least two sets of J-type anchor hooks is hooked from bottom to up to a longitudinal bar of a corresponding reinforcement cage, and a top of each of the at least two sets of the J-type anchor hooks extends upward through concrete along a plumb direction to form an anchor bolt.

7. The test method of claim 6, wherein a bottom of the main pipe that is coaxially socketed to the locking sleeve is fixedly connected to a second flange, and the second flange is fixedly mounted to the raft foundation through the anchor bolt underneath the main pipe; and a bottom of each column is fixedly connected to a first flange, and the each column is mounted on the raft foundation through a cooperation between the first flange and a corresponding anchor bolt.

\* \* \* \* \*